United States Patent
Backhus et al.

(10) Patent No.: US 11,468,316 B2
(45) Date of Patent: Oct. 11, 2022

(54) CLUSTER COMPRESSION FOR COMPRESSING WEIGHTS IN NEURAL NETWORKS

(71) Applicant: Recogni Inc., Cupertino, CA (US)

(72) Inventors: Gilles J. C. A. Backhus, Munich (DE); Eugene M. Feinberg, San Jose, CA (US)

(73) Assignee: Recogni Inc., San Jose, CA (US)

( * ) Notice: Subject to any disclaimer, the term of this patent is extended or adjusted under 35 U.S.C. 154(b) by 887 days.

(21) Appl. No.: 16/273,592

(22) Filed: Feb. 12, 2019

(65) Prior Publication Data

US 2019/0286980 A1 Sep. 19, 2019

Related U.S. Application Data

(60) Provisional application No. 62/672,845, filed on May 17, 2018, provisional application No. 62/642,578, filed on Mar. 13, 2018.

(51) Int. Cl.
*G06N 3/08* (2006.01)
*G06N 3/04* (2006.01)

(52) U.S. Cl.
CPC ............. *G06N 3/08* (2013.01); *G06N 3/04* (2013.01); *G06N 3/0454* (2013.01); *G06N 3/082* (2013.01); *G06N 3/084* (2013.01)

(58) Field of Classification Search
CPC .......... G06N 3/08; G06N 3/04; G06N 3/0454; G06N 3/082; G06N 3/084
See application file for complete search history.

(56) References Cited

U.S. PATENT DOCUMENTS

| 10,373,050 B2 * | 8/2019 | Lin | G06V 10/82 |
|---|---|---|---|
| 10,417,525 B2 * | 9/2019 | Ji | G06N 3/0454 |
| 2016/0217369 A1 * | 7/2016 | Annapureddy | G06N 3/082 |

FOREIGN PATENT DOCUMENTS

CN 107392305 A 11/2017

OTHER PUBLICATIONS

Jafri et al. "MOCHA: Morphable locality and compression aware architecture for convolutional neural networks". 2017 IEEE International Parallel and Distributed Processing Symposium, pp. 276-286 (Year: 2017).*

(Continued)

*Primary Examiner* — Jesse S Pullias
(74) *Attorney, Agent, or Firm* — Ascenda Law Group, PC

(57) ABSTRACT

A method for instantiating a convolutional neural network on a computing system. The convolutional neural network includes a plurality of layers, and instantiating the convolutional neural network includes training the convolutional neural network using a first loss function until a first classification accuracy is reached, clustering a set of F×K kernels of the first layer into a set of C clusters, training the convolutional neural network using a second loss function until a second classification accuracy is reached, creating a dictionary which maps each of a number of centroids to a corresponding centroid identifier, quantizing and compressing F filters of the first layer, storing F quantized and compressed filters of the first layer in a memory of the computing system, storing F biases of the first layer in the memory, and classifying data received by the convolutional neural network.

6 Claims, 20 Drawing Sheets

(56) References Cited

OTHER PUBLICATIONS

Cheng et al. "Model Compression and Acceleration for Deep Neural Networks". arXiv:1710.09282v1 [cs.LG] Oct. 23, 2017 (Year: 2017).*
Bagherinezhad; et al., "LCNN: Lookup-based Convolutional Neural Network", Computer Vision and Pattern Recognition (Jun. 13, 2017), arXiv:1611.06473 [cs CV], 10 pages.
Kim; et al., "Deep Clustered Convolutional Kernels", Machine Learning; Neural and Evolutionary Computing, arXiv:1503.01824 [cs.LG] (Mar. 6, 2015), 9 pages.
Liu; et al., "Computation-Performance Optimization of Convolutional Neural Networks with Redundant Kernel Removal", Computer Vision and Pattern Recognition, arXiv:1705.10748 [cs.CV] (Apr. 10, 2018), 5 pages.
Redmon; et al., "YOLO9000: Better, Faster, Stronger", arXiv:1612.08242v1 [cs.CV] (Dec. 25, 2016), 9 pages.
Roychowdhury; et al., "Reducing Duplicate Filters in Deep Neural Networks", NIPS Workshop on Deep Learning: Bridging Theory and Practice, 2017, 7 pages.
Wu; et al., "Quantized Convolutional Neural Networks for Mobile Devices", Computer Vision and Pattern Recognition, arXiv:1512.06473 [cs.CV] (May 16, 2016), 11 pages.
International Preliminary Report on Patentability dated Sep. 24, 2020, from The International Bureau of WIPO, for International Patent Application No. PCT/US2019/017781 (filed Feb. 13, 2019), 9 pages.
International Search Report and Written Opinion dated Jun. 4, 2019, from the ISA/European Patent Office, for International Patent Application No. PCT/US2019/017781 (filed Feb. 13, 2019), 16 pages.
Gong; et al., "Compressing Deep Convolutional Networks Using Vector Quantization", Cornell University, Dec. 18, 2014, arXiv:1412.6115v1 [cs.CV], pp. 1-10.
Han; et al., "Deep Compression: Compressing Deep Neural Networks With Pruning, Trained Quantization and Huffman Coding", Cornell University, Feb. 15, 2016, arXiv:1510.00149v5 [cs.CV], 14 pages.
Wu; et al., "Quantized Convolutional Neural Networks for Mobile Devices", 2016 IEEE Conference on Computer Vision and Pattern Recognition, Jun. 27, 2016, pp. 4820-4828.

* cited by examiner

Model Training

Model Inference

Dictionary

| Codeword (Centroid ID) | Centroid | | |
|---|---|---|---|
| 0 | $c_0$ | 1.3   4.5   3.8 <br> 6.9   4.1   8.2 <br> 5.7   6.0   2.6 | |
| 1 | $c_1$ | 2.9   7.6   4.2 <br> 0.2   7.1   2.2 <br> 6.0   8.9   1.8 | |
| 2 | $c_2$ | 4.9   7.5   3.8 <br> 5.9   2.8   9.0 <br> 5.3   8.7   3.4 | |
| 3 | $c_3$ | 4.7   8.4   4.8 <br> 9.8   3.3   3.7 <br> 7.9   3.4   3.2 | |
| 4 | $c_4$ | 7.6   5.6   3.9 <br> 6.3   8.9   0.4 <br> 3.7   5.9   5.2 | |
| 5 | $c_5$ | 6.9   3.5   7.4 <br> 8.9   4.9   5.9 <br> 4.0   8.4   3.9 | |
| 6 | $c_6$ | 8.3   5.8   4.7 <br> 2.0   5.8   5.4 <br> 9.8   3.7   3.6 | |
| 7 | $c_7$ | 7.4   5.9   2.0 <br> 5.1   6.0   3.4 <br> 5.8   4.9   3.1 | |

Fig. 14

CLUSTER COMPRESSION FOR COMPRESSING WEIGHTS IN NEURAL NETWORKS

RELATED APPLICATIONS

This is a NONPROVISIONAL of, claims priority to, and incorporates by reference U.S. Provisional Application No. 62/642,578, filed 13 Mar. 2018 and U.S. Provisional Application No. 62/672,845, filed 17 May 2018.

FIELD OF THE INVENTION

The present invention relates to a neural network, and more particularly relates to quantizing and compressing the parameters of a neural network by using clustering techniques.

BACKGROUND

Today, neural networks (in particular convolutional neural networks) are widely used for performing image recognition/classification (e.g., recognizing an entire image to be of the class "dog"), object recognition/classification (e.g., recognizing that in an image there is a "dog" at a particular position with a particular size) and image segmentation (e.g., identifying certain pixels in an image that belong to an object in the class of "dog"). While having numerous applications (e.g., object identification for self-driving cars, facial recognition for social networks, etc.), neural networks require intensive computational processing and frequent memory accesses. Described herein are techniques for reducing the quantity of data accessed from a memory when loading the parameters of a neural network into a compute engine.

SUMMARY OF THE INVENTION

In one embodiment, the present invention provides a method for instantiating a convolutional neural network on a computing system. The convolutional neural network includes a plurality of layers, and instantiating the convolutional neural network includes training the convolutional neural network using a first loss function until a first classification accuracy is reached, clustering a set of F×K kernels of the first layer into a set of C clusters, training the convolutional neural network using a second loss function until a second classification accuracy is reached, creating a dictionary which maps each of a number of centroids to a corresponding centroid identifier, quantizing and compressing F filters of the first layer, storing F quantized and compressed filters of the first layer in a memory of the computing system, storing F biases of the first layer in the memory, and classifying data received by the convolutional neural network.

The first loss function calculates a classification error of the convolutional neural network. Training the convolutional neural network with the first loss function includes optimizing, for a first one of the layers, a first set of F filters and a first set of F biases so as to minimize the first loss function, wherein each of the F filters is formed from K kernels, wherein each of the kernels has N-dimensions, and wherein each of the biases is scalar.

Each of the clusters is characterized by a centroid, thus, the C clusters are characterized by C centroids. Each of the centroids has N-dimensions, and C is less than F×K.

The second loss function is a linear combination of the classification error and a clustering error. The clustering error aggregates a deviation between each of the kernels and one of the C centroids nearest to the respective kernel. Training the convolutional neural network with the second loss function includes optimizing the F filters and the F biases so as to minimize the second loss function.

The quantizing and compressing of the F filters of the first layer includes, for each of the F×K kernels, replacing the kernel with a centroid identifier that identifies a centroid that is closest to the kernel. The F quantized and compressed filters include F×K centroid identifiers.

The classification includes retrieving the F quantized and compressed filters of the first layer from memory; decompressing, using the dictionary, the F quantized and compressed filters of the first layer into F quantized filters by mapping the F×K centroid identifiers into F×K corresponding quantized kernels, the F×K corresponding quantized kernels forming the F quantized filters; retrieving the F biases of the first layer from memory; and for the first layer, computing a convolution of the received data or data output from a layer previous to the first layer with the F quantized filters and the F biases.

In some embodiments, the present method also includes, during the instantiation of the convolutional neural network, further storing the dictionary in the memory; and during the classification of the received data, further retrieving the dictionary from the memory.

In various embodiments, C may be equal to $2^n$, where n is a natural number, the centroid identifier may be expressed using n-bits, the F×K kernels may be clustered into the C clusters using the k-means algorithm, and/or each of the F×K kernels may be represented by a $\sqrt{N} \times \sqrt{N}$ matrix of parameters.

BRIEF DESCRIPTION OF THE DRAWINGS

FIG. 14 depicts a dictionary used during the compression and de-compression of the F filters, in accordance with one embodiment of the invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Description associated with any one of the figures may be applied to a different figure containing like or similar components/steps.

Multi-layer machine learning models (e.g., neural networks), especially those used for computer vision, have tens or hundreds of millions of parameters. The size of such a model can easily be as big as tens or hundreds of megabytes. There are multiple possible reasons why it would be advantageous to reduce the size of such a model. One of the possible reasons is to minimize the model size so that the parameters can be stored using smaller memories, such as a static random access memory (SRAM) on the same chip as the convolver/convolution engine, as opposed to a memory external from the convolver/convolution engine (e.g., dynamic random access memory (DRAM) or Flash memory). More importantly, reducing the amount of memory accesses when loading all weights of a particular layer into a computation engine of a neural network is crucial for low-power applications.

Figure 1:
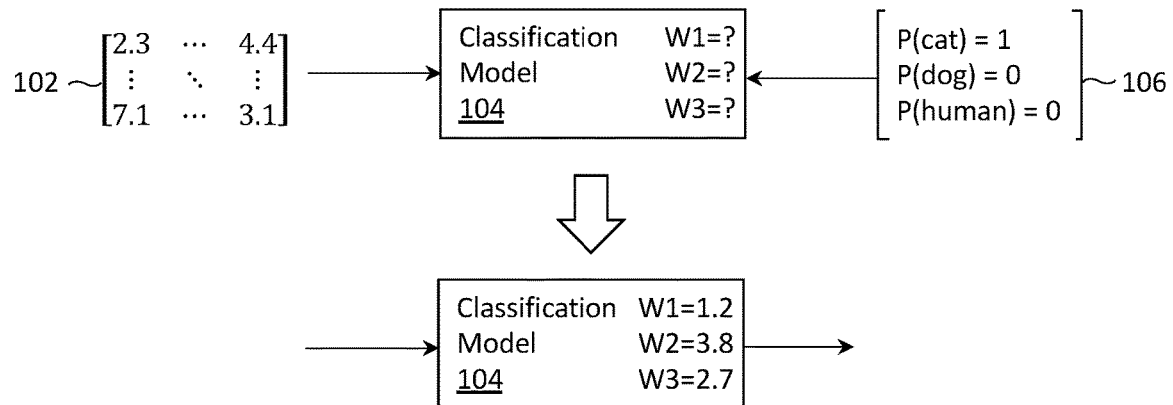
FIG. 1 depicts a diagram providing an overview of model training and model application in a neural network.
Figure 1:
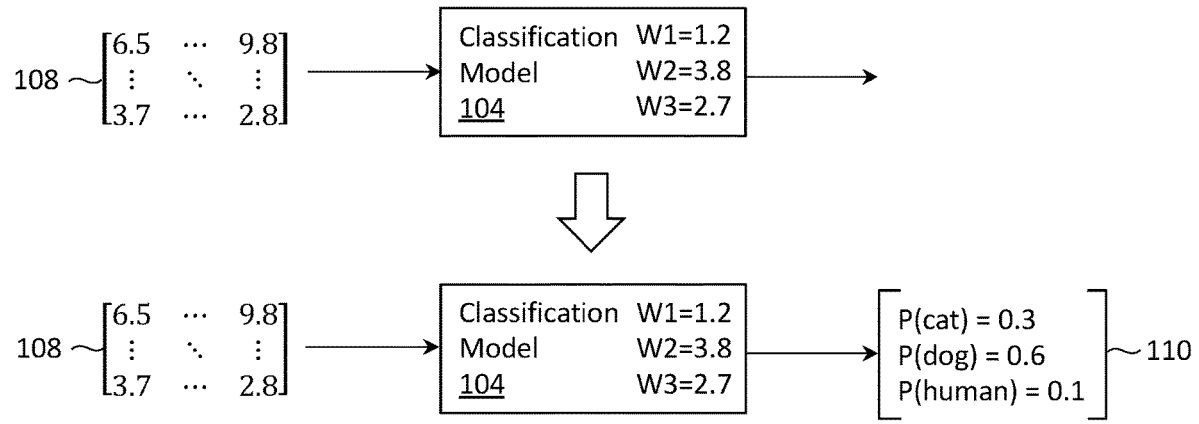

FIG. 1 depicts a diagram providing an overview of the training phase and the inference phase in a neural network. In the training phase, pairs of input and known (or desired) output may be provided to train model parameters (also called "weights") of classification model 104. For conciseness, only one input and output pair (102, 106) is depicted in FIG. 1, but in practice many known input and output pairs will be used to train classification model 104. In the example of FIG. 1, input 102 is a matrix of numbers (which may represent the pixels of an image) and known output 106 is a vector of classification probabilities (e.g., the probability that the input image is a cat is 1, the probability that the input image is a dog is 0, and the probability that the input image is a human is 0). In one possible training process, the classification probabilities may be provided by a human (e.g., a human can recognize that the input image depicts a cat and assign the classification probabilities accordingly). At the conclusion of the model training process, the model parameters will have been estimated (e.g., W1=1.2, W2=3.8, W3=2.7). Sometimes, there may be intuitive ways to interpret the model parameters, but many times no intuition may be associated therewith, and the model parameters may simply be the parameters that minimize the error between the model's classification of a given set of input with the known classification (while at the same time avoiding "model overfitting").

In the inference (or prediction or feed-forward) phase, model 104 with trained parameters (i.e., parameters trained during the training phase) is used to classify a set of input. In the instant application, the trained classification model 104 provides the classification output 110 of a vector of probabilities (e.g., the probability that the input image is a cat is 0.3, the probability that the input image is a dog is 0.6, and the probability that the input image is a human is 0.1) in response to input 108.

One embodiment of classification model 104 is a convolutional neural network, which will be described in detail in FIG. 9. A basic building block of a convolutional neural network is a convolution operation, which is described in FIGS. 2-7. As further described below, a convolution operation may refer to a 2-dimensional convolution operation with 2-dimensional input and a 2 dimensional filter, a 3-dimensional convolution operation with 3-dimensional input and a 3 dimensional filter, etc. Other building blocks of a convolutional neural network may include a long short-term memory (LSTM) unit (not described herein for conciseness).

Figure 2:
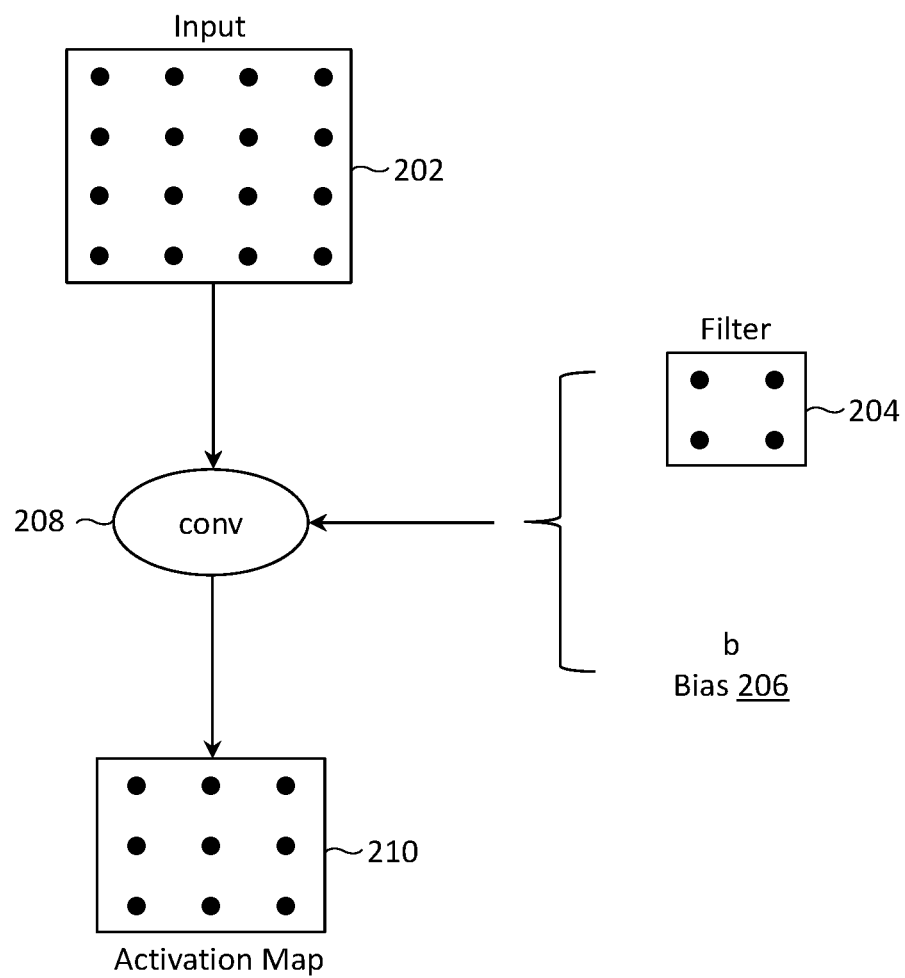
FIG. 2 depicts a diagram of the input, model parameters and output of a convolution operation, the model parameters including a single 2-dimensional filter.

FIG. 2 depicts a diagram of the input, model parameters and output of a convolution operation, the model parameters including a single 2-dimensional filter. In the example of FIG. 2, the input includes a 2-dimensional matrix of numerical values (each of the numerical values abstractly represented by "•"). The matrix in the example of FIG. 2 is a 4×4 matrix, but other input could have different dimension (e.g., could be a 100×100 square matrix, a 20×70 rectangular matrix, etc.). Later presented examples will illustrate that the input may even be a 3-dimensional object. In fact, the input may be an object of any number of dimensions. The input may represent pixel values of an image or may represent the output of a previous convolution operation.

The model parameters may include a filter and a bias. In the example of FIG. 2, the filter is a 2×2 matrix of values and the bias is a scalar value. Later presented examples will illustrate that the dimensions of the filter may vary (e.g., could be a 3×3 square matrix) and further the number of dimensions may be greater than 2 (e.g., could be a 3×3×256 object). Typically, there is one bias associated with each filter. The example in FIG. 2 includes one filter, so there is one corresponding bias. However, in certain embodiments, if there were 5 filters, there would be 5 associated biases.

The convolution operator 208 (abbreviated "conv") receives input 202 and the model parameters 204, 206 and generates output 210 called an activation map or a feature map. Each value of the activation map is generated as a dot product of input 202 and filter 204 (at a certain spatial location relative to input 202) summed with the bias 206. The computations to arrive at activation map 210 are described in more detail below in FIG. 3.

Figure 3:
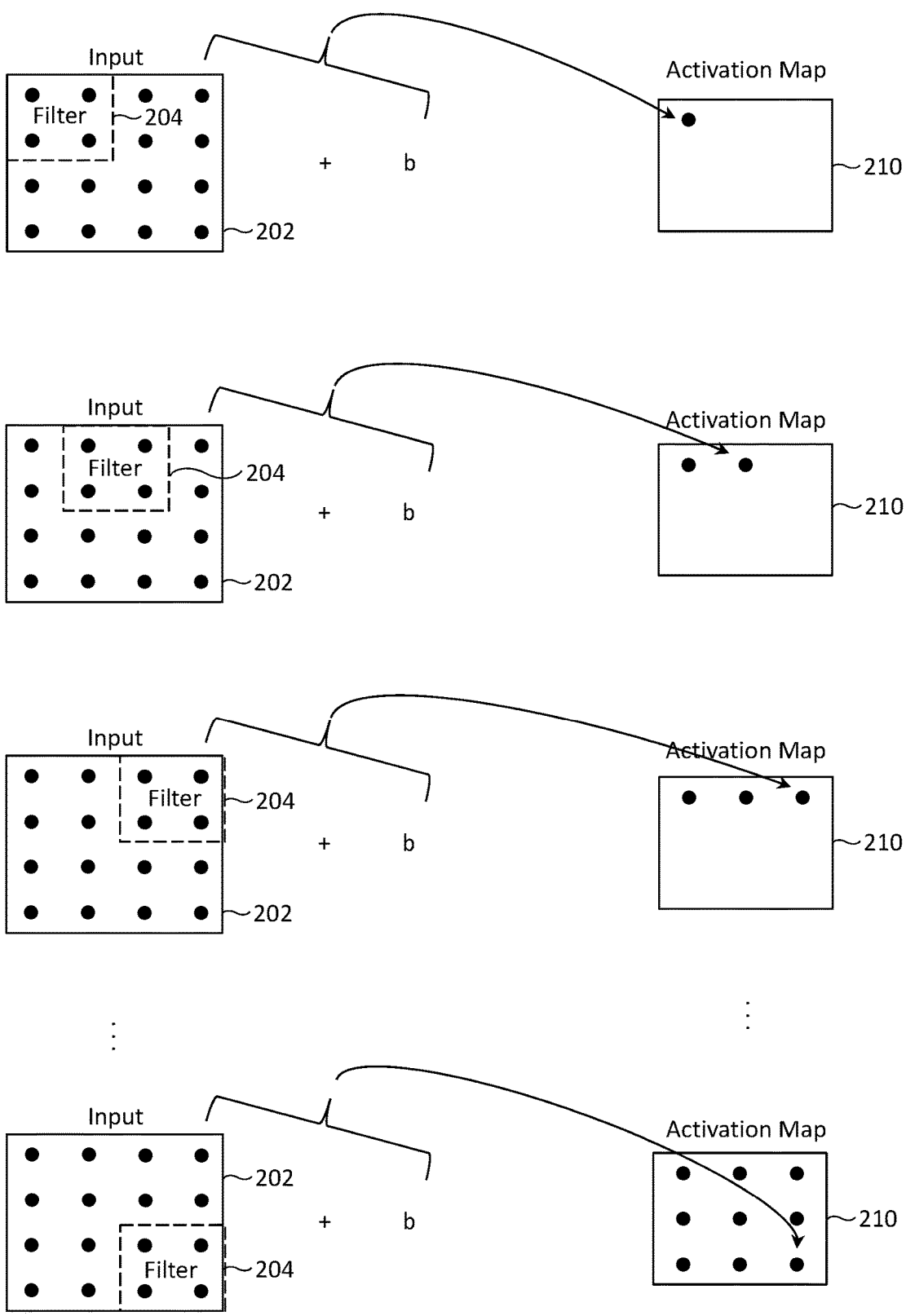
FIG. 3 depicts a diagram that explains the computation of a convolution operation using a 2-dimensional filter.

The first row of FIG. 3 describes the computation of the element at position (1, 1) of activation map 210. As shown in the first row, filter 204 is "aligned" with the elements at positions (1, 1), (1, 2), (2, 1) and (2, 2) of input 202. A dot product is computed between filter 204 and these four values of input 202. The dot product is then summed with bias b to arrive at the element at position (1, 1) of activation map 210.

The second row of FIG. 3 describes the computation of the element at position (1, 2) of activation map 210. As shown in the second row, filter 204 is "aligned" with the elements at positions (1, 2), (1, 3), (2, 2) and (2, 3) of input 202. A dot product is computed between filter 204 and these four values of input 202. The dot product is then summed with bias b to arrive at the element at position (1, 2) of activation map 210.

The third row of FIG. 3 describes the computation of the element at position (1, 3) of activation map 210. As shown in the third row, filter 204 is "aligned" with the elements at positions (1, 3), (1, 4), (2, 3) and (2, 4) of input 202. A dot product is computed between filter 204 and these four values of input 202. The dot product is then summed with bias b to arrive at the element at position (1, 3) of activation map 210.

The fourth row of FIG. 3 describes the computation of the element at position (3, 3) of activation map 210. As shown in the fourth row, filter 204 is "aligned" with the elements at positions (3, 3), (3, 4), (4, 3) and (4, 4) of input 202. A dot product is computed between filter 204 and these four values of input 202. The dot product is then summed with bias b to arrive at the element at position (3, 3) of activation map 210. In general, the convolution operation comprises a plurality of shift (or align), dot product and bias (or sum) steps. In the present example, the filter was shifted by 1 spatial position between dot product computations (called the step size or stride), but other step sizes of 2, 3, etc. are possible. Also, while it is possible to add zero padding around input 202, zero padding was not described in FIG. 3 for conciseness and simplicity.

Figure 4:
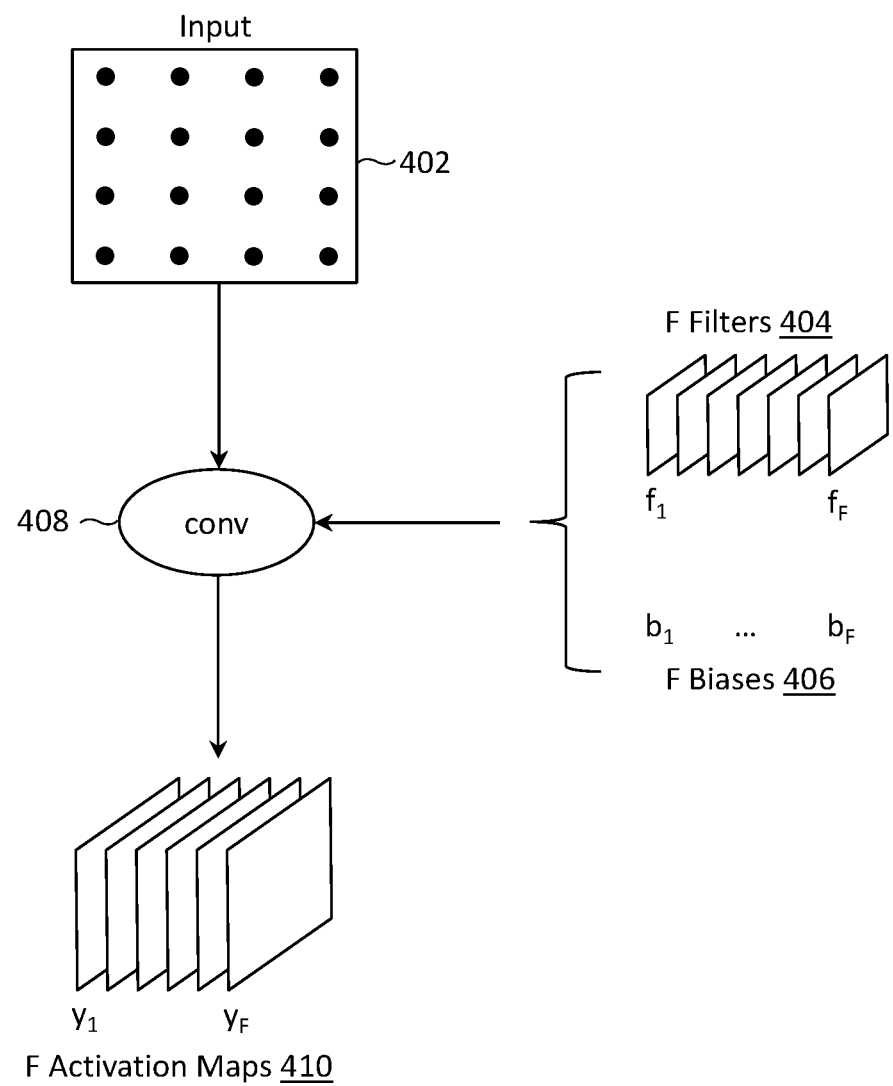
FIG. 4 depicts a diagram of the input, model parameters and output of a convolution operation, the model parameters including a plurality of 2-dimensional filters.

FIG. 4 is similar to FIG. 2, except that there are F filters 404, F biases 406 and F activation maps 410 instead of a single filter 204, a single bias 206 and a single activation map 210. The relation between the F filters 404, F biases 406 and F activation maps 410 is as follows. Filter $f_1$, bias $b_1$ and input 402 are used to compute activation map $y_1$ (in very much the same way that filter 204, bias 206 and input 202 were used to compute activation map 210 in FIG. 2); filter $f_2$, bias $b_2$ and input 402 are used to compute activation map $y_2$; and so on.

Figure 5:
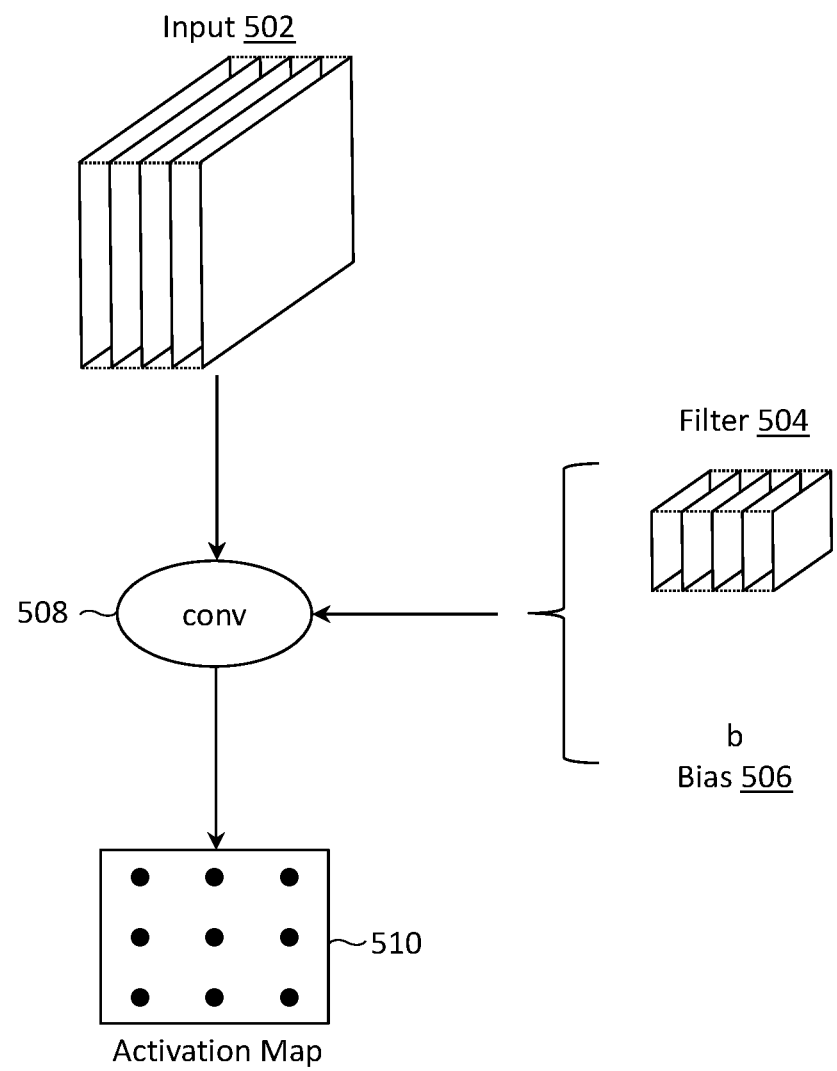
FIG. 5 depicts a diagram of the input, model parameters and output of a convolution operation, the model parameters including a single 3-dimensional filter.

FIG. 5 is similar to FIG. 2, except that instead of a 2-dimensional input 202 and a 2-dimensional filter 204, there is a 3-dimensional input 502 and a 3-dimensional filter 504. The computations to arrive at activation map 510 are described in more detail below in FIG. 6. While input 502 and filter 504 are 3-dimensional, activation map 510 is still 2-dimensional, as will become clear in the associated description of FIG. 6.

Figure 6:
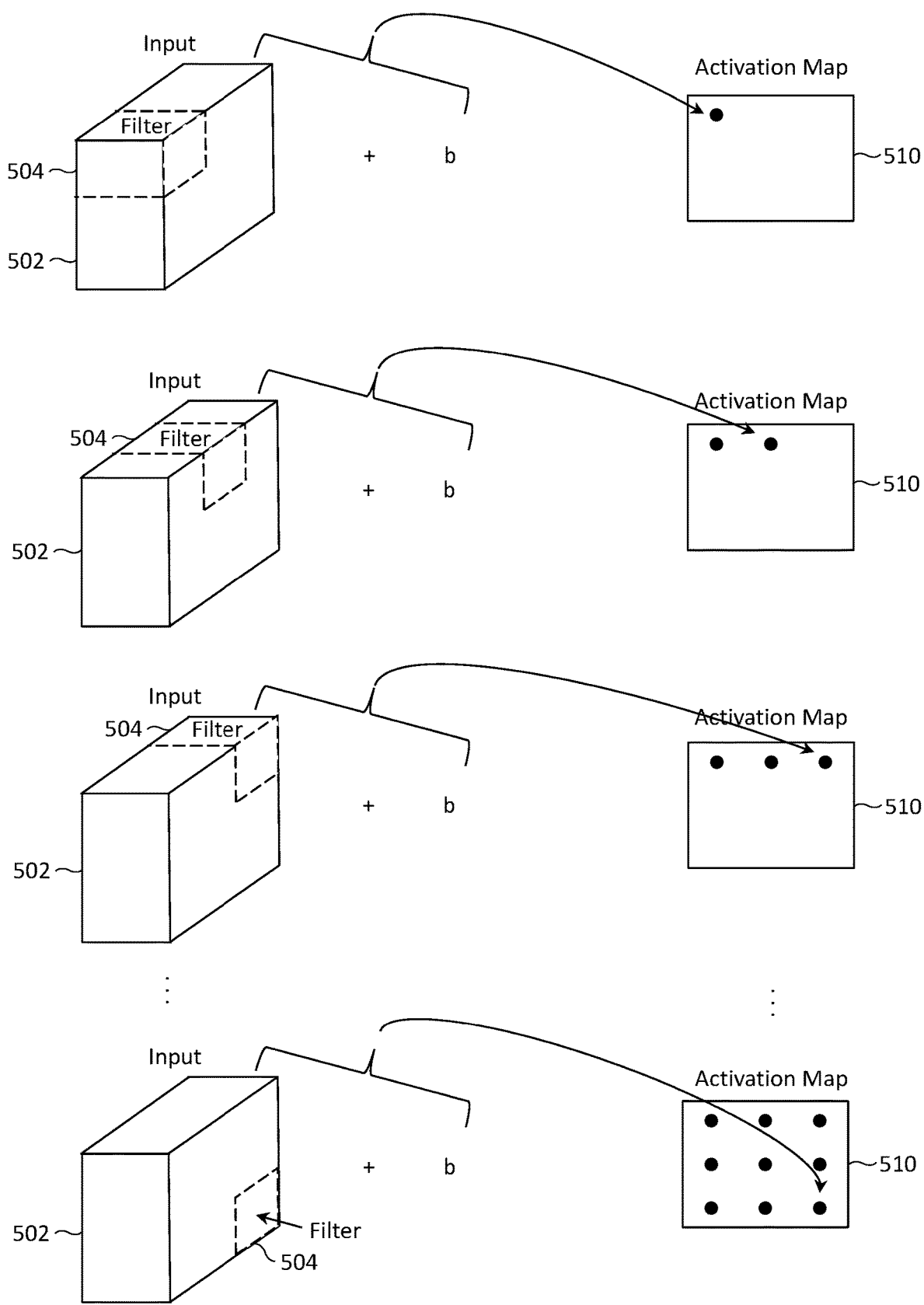
FIG. 6 depicts a diagram that explains the computation of a convolution operation using a 3-dimensional filter.

The first row of FIG. 6 describes the computation of the element at position (1, 1) of activation map 510. As shown in the first row, filter 504 is "aligned" with the elements at positions (1, 1, z), (1, 2, z), (2, 1, z) and (2, 2, z) of input 502, where $z \in \{1, 2, 3, 4\}$. A dot product is computed between filter 504 and these sixteen values of input 502. The dot product is then summed with bias b to arrive at the element at position (1, 1) of activation map 510.

The second row of FIG. 6 describes the computation of the element at position (1, 2) of activation map 510. As shown in the second row, filter 504 is "aligned" with the elements at positions (1, 2, z), (1, 3, z), (2, 2, z) and (2, 3, z) of input 502, where $z \in \{1, 2, 3, 4\}$. A dot product is computed between filter 504 and these sixteen values of input 502. The dot product is then summed with bias b to arrive at the element at position (1, 2) of activation map 510.

The third row of FIG. 6 describes the computation of the element at position (1, 3) of activation map 510. As shown in the third row, filter 504 is "aligned" with the elements at positions (1, 3, z), (1, 4, z), (2, 3, z) and (2, 4, z) of input 502, where $z \in \{1, 2, 3, 4\}$. A dot product is computed between filter 504 and these sixteen values of input 502. The dot product is then summed with bias b to arrive at the element at position (1, 3) of activation map 510.

The fourth row of FIG. 6 describes the computation of the element at position (3, 3) of activation map 510. As shown in the fourth row, filter 504 is "aligned" with the elements at positions (3, 3, z), (3, 4, z), (4, 3, z) and (4, 4, z) of input 502, where $z \in \{1, 2, 3, 4\}$. A dot product is computed between filter 504 and these sixteen values of input 502. The dot product is then summed with bias b to arrive at the element at position (3, 3) of activation map 510. If not already apparent, the depth of filter 504 (or the magnitude of the "z" dimension of filter 504) must match the depth of input 502 (or the magnitude of the "z" dimension of input 502). The depth of input 502 is sometimes called the number of channels of input 502. In the present example of FIG. 5, the depth of input 502 and filter 504 were both four.

Figure 7:
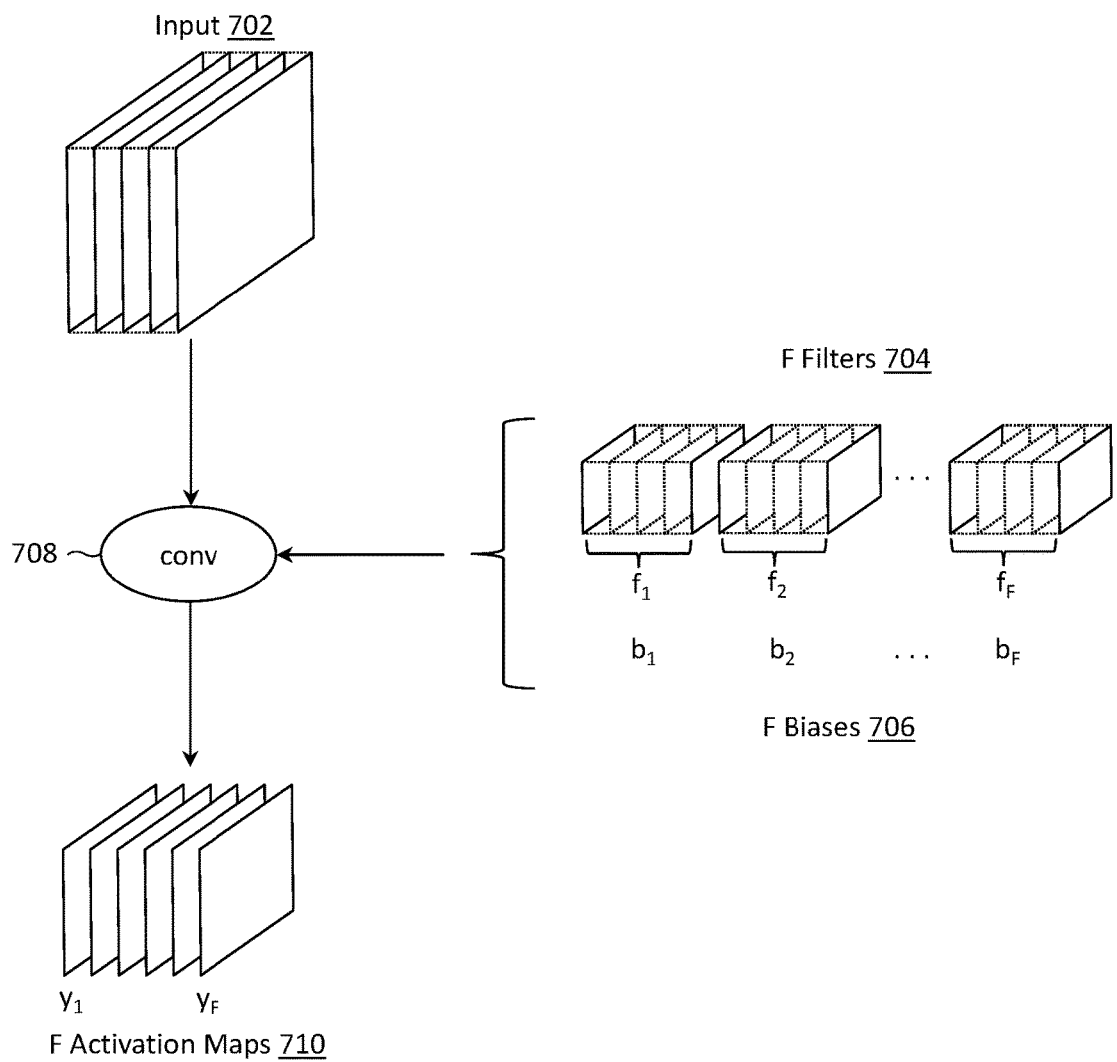
FIG. 7 depicts a diagram of the input, model parameters and output of a convolution operation, the model parameters including a plurality of 3-dimensional filters.

FIG. 7 is similar to FIG. 5, except that there are F 3-dimensional filters 704, F biases 706 and F activation maps 710 (F>1), instead of a single 3-dimensional filter 504, a single bias 506 and a single activation map 510. The relation between the F 3-dimensional filters 704, F biases 706 and F activation maps 710 is as follows. Filter $f_1$, bias $b_1$ and input 702 are used to compute activation map $y_1$ (in very much the same way that filter 504, bias 506 and input 502 were used to compute activation map 510 in FIG. 5); filter $f_2$, bias $b_2$ and input 702 are used to compute activation map $y_2$; and so on.

Figure 8:
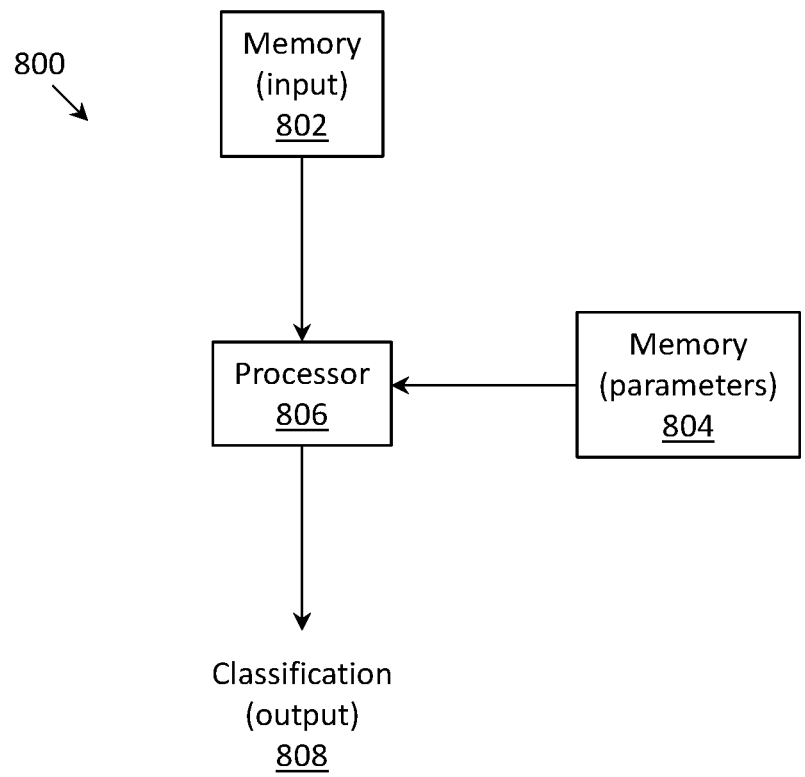
FIG. 8 depicts a computing system within which a neural network is instantiated.

FIG. 8 depicts computing system 800 within which a neural network may be instantiated. Processor 806 may retrieve input data (similar to input 202 in FIG. 2, input 402 in FIG. 2, etc.) from memory 802. Examples of processor 806 include a general processor, a central processing unit (CPU), a field-programmable gate array (FPGA), an application-specific integrated circuit (ASIC), a microcontroller, etc. Examples of memory 802 include SRAM, DRAM, Flash memory, electrically erasable programmable read-only memory (e.g., EEPROM), etc. Processor 806 may retrieve model parameters (similar to filter 204 and bias 206 in FIG. 2, filter 404 and bias 406 in FIG. 4, etc.) from memory 804. Based on the retrieved input and model parameters, processor 806 may perform convolution computations, rectified linear unit (reLU) computations, max pooling computations, and other computations in order to generate a classification 808 of the input from memory 802.

Figure 9:
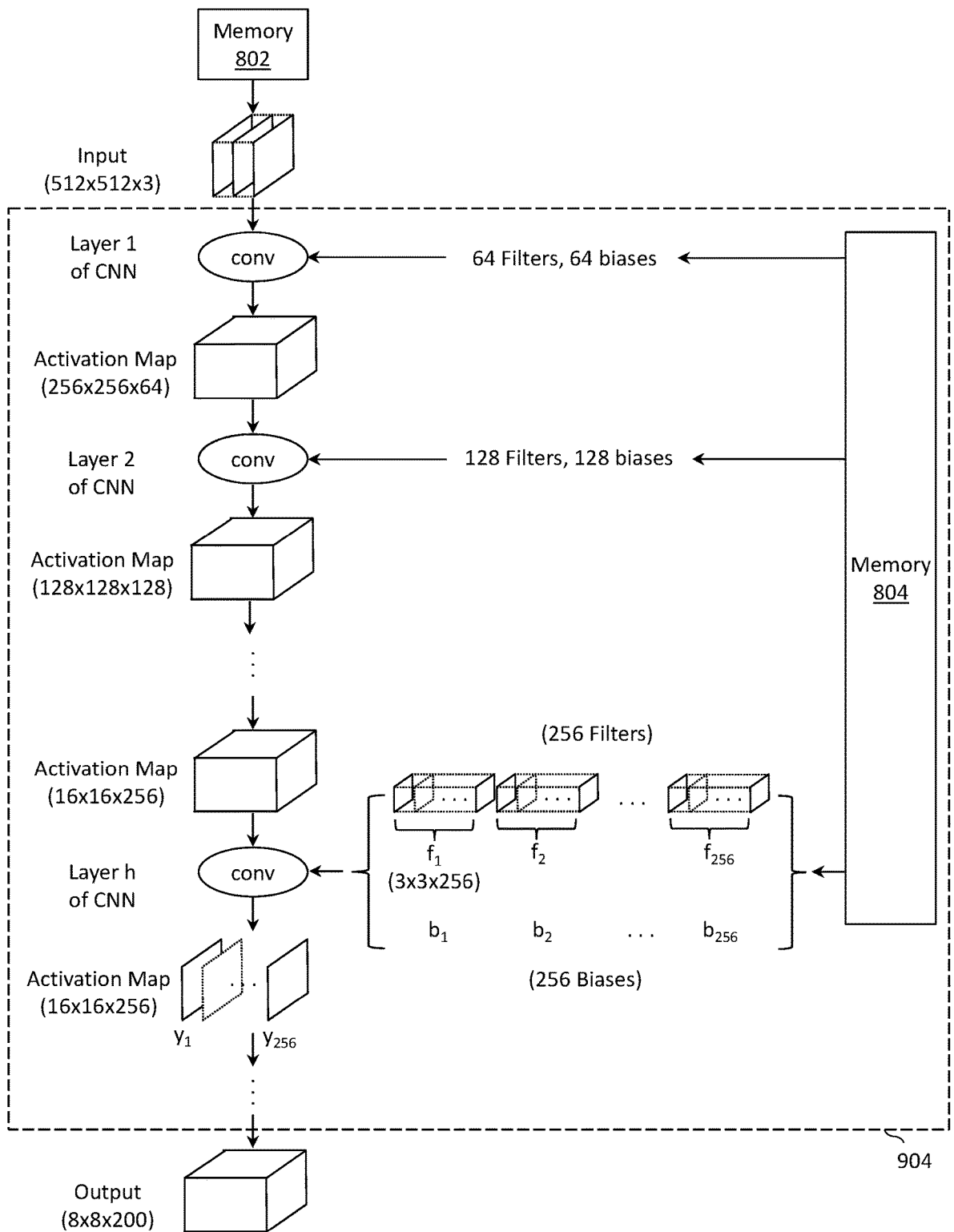
FIG. 9 depicts a convolutional neural network including a plurality of layers, in accordance with one embodiment of the invention.

FIG. 9 depicts convolutional neural network 904 which includes a plurality of layers (or stages), in accordance with one embodiment of the invention. The input with dimension 512×512×3 may conceptually correspond to input 102 (or 108) depicted in FIG. 1. In the example of FIG. 9, the input may be a portion of a color image consisting of 512 by 512 pixels. The input depth of 3 (i.e., z-dimension of input) may represent the red, green, and blue components of the color image.

The output with dimensions 8×8×200 may conceptually correspond to output 106 (or 110) depicted in FIG. 1. In the example of FIG. 9, the first 8×8 matrix (i.e., (x, y, 1) for x $\in\{1, \ldots, 8\}$ and y$\in\{1, \ldots, 8\}$) in the output may classify objects in the input. Each classification value in the first 8×8 matrix may indicate a certain object (e.g., 1 for cat, 2 for dog, 3 for human). The position of the classification value in the first 8×8 matrix may provide spatial information of the classified object in the input image (e.g., value of 1 in element (1, 1) of the first 8×8 matrix may indicate a cat being located in the top left corner of the input image). The depth (i.e., z) dimension of the output may specify attributes associated with the classified object. The attributes may include whether the object is oriented in a vertical manner (e.g., standing position), whether the object is oriented in a horizontal manner (e.g., lying down position), etc.

Convolutional neural network 904 in FIG. 9 may be an example of classification model 104 in FIG. 1. Convolutional neural network 904 may be constructed using a plurality of layers (e.g., convolution layer, reLU layer, max pool layer, LSTM layer, etc.). Note that the particular structure of a given convolutional neural network may vary in terms of the numbers and types of layers, the dimensions of the input and output, the dimensions of the filters, and the like. In the example of FIG. 9, only convolution layers are depicted for simplicity. In layer 1, the input with a dimension of 512×512×3 is convolved with 64 filters and 64 biases to generate an activation map with a dimension of 256×256×64. In layer 2, the input with a dimension of 256×256×64 is convolved with 128 filters and 128 biases to generate an activation map with a dimension of 128×128×128. In layer h, the input with a dimension of 16×16×256 is convolved with 256 filters and 256 biases to generate an activation map with a dimension of 16×16×256. Other layers of convolutional neural network 904 have been omitted for conciseness.

Similar to the example of FIG. 1, the parameters of convolutional neural network 904 are trained during a training phase. The parameters of convolutional neural network 904 include the parameters that are part of the various filters and biases. Once the parameters have been trained, convolutional neural network 904 may be applied to classify the informational content within an input image. It will be more apparent following the quantization and data compression techniques described in the next several figures, but it is noted for clarity that the structure of convolutional neural network 904 depicted in FIG. 9 more specifically corresponds to the convolutional neural network 904 during the training phase. During the inference phase, codewords are retrieved from memory 804, which are decompressed into quantized versions of the 256 filters of layer h, and the 256 quantized filters (along with 256 corresponding biases) are used to perform the convolution operation for layer h.

In battery-powered devices, power is often limited. Power is limited not only due to the finite reservoir of energy stored in the battery, but also because high power use can lead to excessive heating of the device which is not desirable. In particular, power is consumed each time parameters are retrieved from memory, such as memory 804. One object of the present invention is to improve the functioning of the computing system 800 by reducing its power consumption.

The power consumption may be reduced by minimizing the amount of data that is read from (or stored to) memory, such as memory 804. One way to minimize the amount of data that is stored to and/or read from memory 804 is to store and/or retrieve compressed and quantized version of the filters. For clarity in explanation, the following discussion will focus on quantizing and compressing the 256 filters of layer h, but it is understood that the same techniques may be applied to quantize and compress filters of a different one of the layers.

While minimizing the power usage could be one benefit and/or application of the invention, it is understood that there may be other applications such as reducing the amount of data that is stored to and retrieved from memory 804 (which has applicability even in a system that is not power-limited), which in turns allows for a reduced size of memory 804. As briefly explained above, the reduced size of memory 804 may allow the memory to be located on the same chip as the convolver/convolution engine (e.g., same chip as processor 806), allowing for a quicker storage and retrieval of the model parameters.

As an overview of the algorithm to compress and quantize the 256 filters of layer h, the 256 filters are first trained via a backpropagation algorithm (or another optimization procedure such as a particle swarm optimization, a genetic algorithm, etc.). For completeness, it is noted that the backpropagation algorithm is applied to optimize the parameters of the 256 filters of layer h and its associated 256 biases (as well as the parameters of filters and biases from other layers) with the objective of minimizing the classification error (i.e., minimizing the likelihood that the predicted classification does not match the correct classification provided in the training data). Stated differently, the loss function of the conventional backpropagation algorithm may include the classification error, and the backpropagation algorithm may minimize this loss function. The backpropagation algorithm is well known in the field and will not be described herein for conciseness. After the 256 filters are trained until a first degree of classification accuracy is reached, the 256 filters are quantized. After the 256 filters are quantized, the 256 quantized filters are compressed. A compressed version of the 256 quantized filters is stored in memory 804. During the model application phase, the 256 compressed and quantized filters are retrieved from memory 804. The 256 compressed and quantized filters are decompressed into 256 quantized filters. The convolution operation from layer h is then performed using the 256 quantized filters (and the associated 256 biases). The storing and retrieval of the 256 biases to/from memory 804 may proceed in a conventional fashion so these details will not be described for the sake of conciseness.

Figure 10:
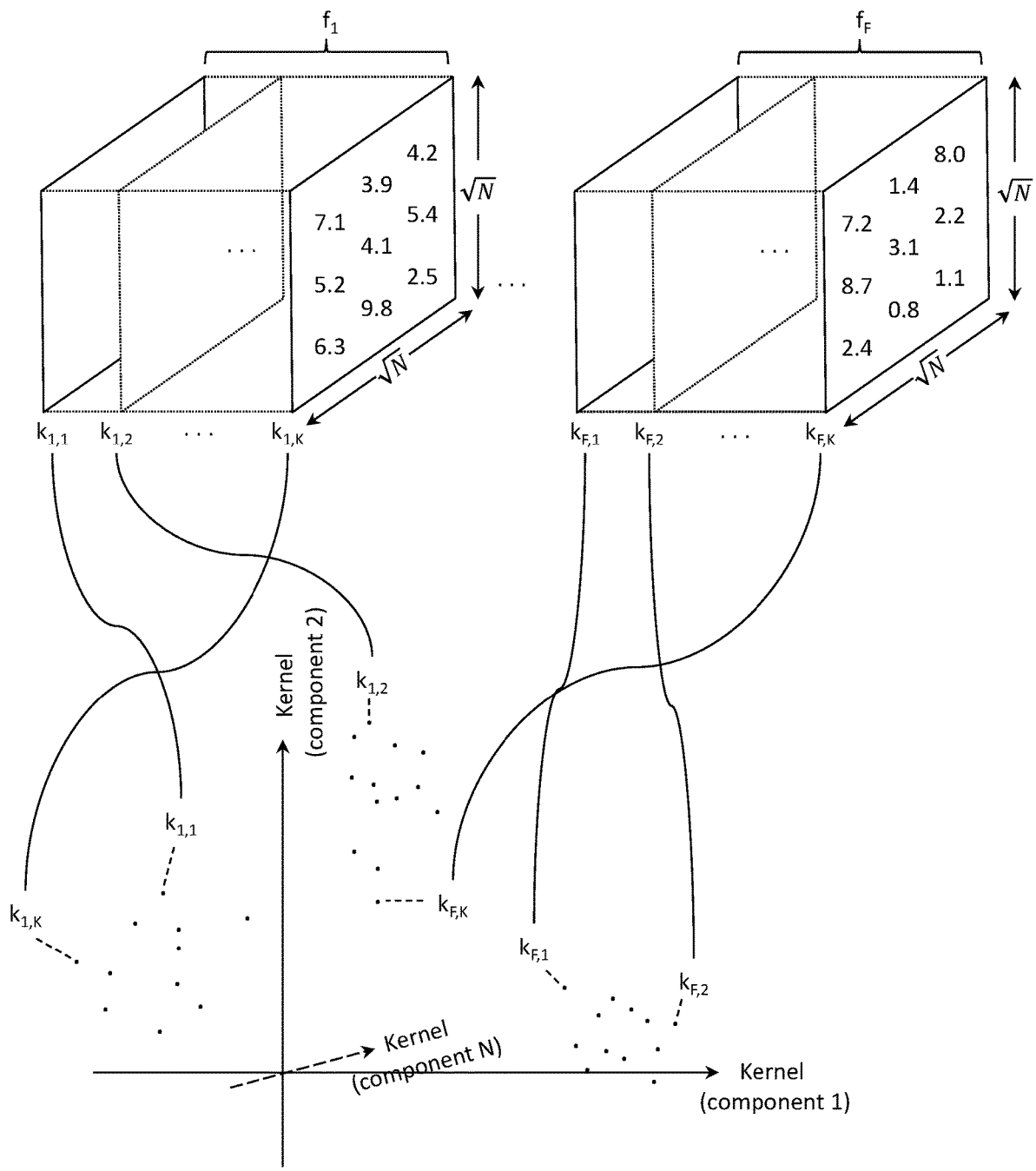
FIG. 10 depicts a diagram in which F filters are constructed using F×K kernels, and a visualization of the F×K kernels as points in an N-dimensional space, in accordance with one embodiment of the invention.

The quantization, compression and decompression approach is now described in detail with respect to FIGS. 10-15. In FIG. 10, it is assumed that the 256 (or F) filters depicted are the filters which have already been trained by a backpropagation algorithm (or other optimization algorithm) to minimize the classification error. Each of the F filters is then decomposed into K kernels. In the example of FIGS. 9 and 10, each filter is a 3-dimensional object with dimensions 3×3×256 (or 3×3×K). FIG. 10 illustrates how each of the filters can be decomposed into 256 (or K) 3×3 kernels. For example, filter $f_1$ is decomposed into K kernels, $k_{1,j}$ for j=1 ... K; filter $f_2$ is decomposed into K kernels, $k_{2,j}$ for j=1 ... K; and so on. If one were to visualize a filter as a stick of butter, the K kernels (at least for this particular decomposition) may be visualized as thin slices of butter.

It is noted that the decomposition of kernels illustrated in FIG. 10 is only an example, and a filter can be decomposed into kernels in a different fashion. As another example (not depicted), each filter may be constructed from nine kernels, in which kernel 1 is constructed as the vector with elements at the positions (1, 1, z) of the respective filter, where $z \in \{1, \ldots 256\}$; kernel 2 is constructed as the vector with elements at the positions (1, 2, z) of the respective filter, where $z \in \{1, \ldots, 256\}$; ... and kernel 9 is constructed as the vector with elements at the positions (3, 3, z) of the respective filter, where $z \in \{1, \ldots, 256\}$. If one were to visualize the filter as a stick of butter, the nine kernels (at least for this particular decomposition) may be visualized as nine long skinny rods of butter.

Returning to the depicted decomposition in which each of the F filters is decomposed into K 3×3 kernels, each of the F×K kernels may be visualized as a point in a 9-dimensional space. The reason for a 9-dimensional space is that a 3×3 kernel has 9 parameters (or components). Each of the axes of the 9-dimensional space represents a component of the kernel. If 4×4 kernels were used, the kernels could be visualized as a point in a 16-dimensional space.

Figure 11:
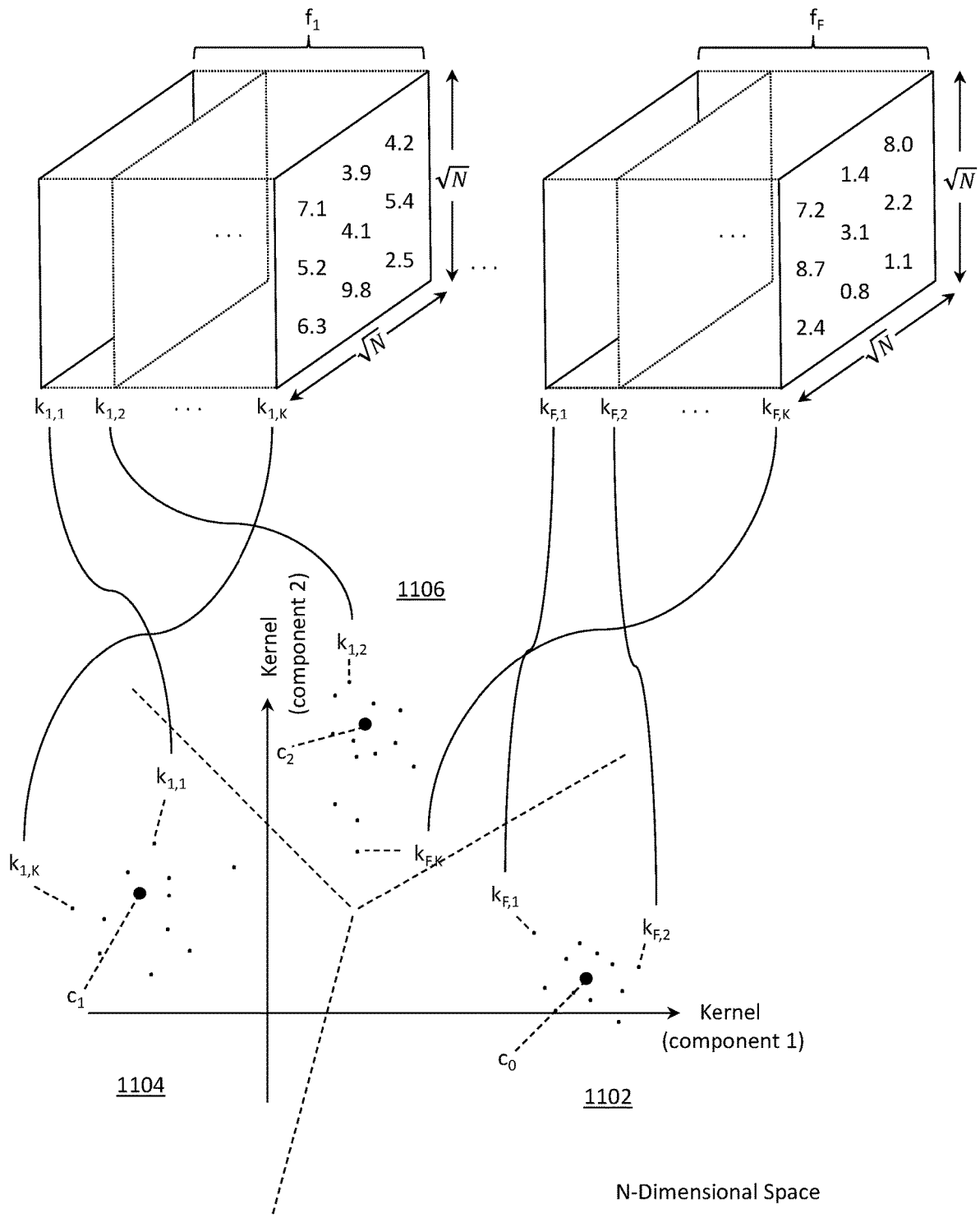
FIG. 11 depicts a diagram in which the F×K kernels are clustered into C clusters, and each of the C clusters is characterized by a centroid, in accordance with one embodiment of the invention.

In FIG. 11, the F×K kernels (each kernel being a 3×3 matrix) are clustered into C clusters using the k-means algorithm or other clustering algorithm. For clarity, it is noted that no association between the k in "k"-means and the variable k to denote a kernel is intended. The k-means algorithm is well known in the art and will not be described herein for conciseness. For simplicity in explanation, assume that C=8 (i.e., there are 8 clusters). For ease of depiction only 3 of the 8 clusters have been depicted. The 8 clusters may be defined by Voronoi regions (i.e., partitions of the 9-dimensional space each of which contains a respective cluster of the kernels). Voronoi region 1102 corresponds to cluster 0; Voronoi region 1104 corresponds to cluster 1; Voronoi region 1106 corresponds to cluster 2; and so on for the remaining Voronoi regions which are not depicted. In one embodiment, C is chosen to be a power of 2 (i.e., $C=2^n$, where n is a natural number) for reasons that will become clearer later on (i.e., allows for efficient use of bits to store centroid identifiers).

A centroid is associated with each of the clusters, and may be computed as the center of mass of the kernels within the cluster. If the centroid of a cluster were represented as a vector of numbers, the first component of the centroid would be computed as the average of the first components of all the kernels within the cluster, the second component of the centroid would be computed as the average of the second components of all the kernels within the cluster, etc. Three centroids have been drawn in FIG. 11 as black dots. Centroid $c_0$ corresponds to cluster 0; centroid $c_1$ corresponds to cluster 1; centroid $c_2$ corresponds to cluster 2; and so on for the remaining centroids which are not depicted.

One way to quantize the F×K kernels would be to, at this point in the approach, set each of the kernels equal to its corresponding centroid (i.e., the centroid of the Voronoi region within which the kernel is located). While such type of quantization is possible, the proposed approach performs a further optimization step (described in FIG. 12) before such quantization step is performed.

Figure 12:
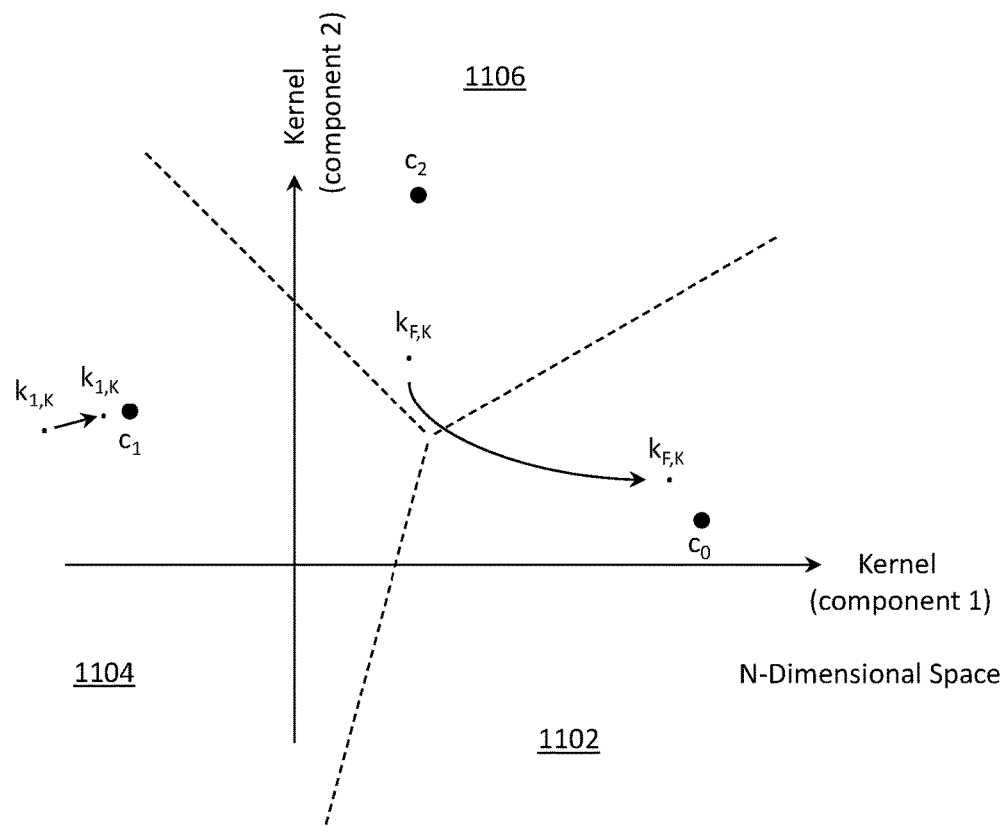
FIG. 12 depicts a diagram to illustrate a joint optimization process performed on the F×K kernels, in accordance with one embodiment of the invention.

FIG. 12 describes the intuition behind an optimization process in which the classification error and the deviation between each of the kernels and its closest centroid (called the "clustering error" for brevity) are jointly minimized. The loss function may be formulated as a linear combination of the classification error and the clustering error (or another mathematical function which combines the classification error and the clustering error). The backpropagation algorithm (or other optimization algorithm) may be applied to minimize the instant loss function. For clarity, it is noted that the backpropagation algorithm is applied to minimize a first loss function, thereby arriving at the filters (and corresponding kernels) depicted in FIG. 11; centroids are computed using the k-means algorithm (as depicted in FIG. 11); and a subsequent backpropagation algorithm is applied to minimize a second loss function (described in association with FIG. 12). Therefore, there may be two stages of backpropagation—one prior to FIG. 11 and one during FIG. 12.

FIG. 12 describes how, during the iterations of the second backpropagation stage, one may visualize the points (representing kernels) as moving in the 9-dimensional space. If the loss function only accounts for the clustering error, each point would migrate towards its closest centroid. However, since the loss function contains the classification error in addition to the clustering error, some points may actually move toward a centroid other than the closest centroid. For simplicity of depiction and explanation, only two of the F×K kernels are depicted in FIG. 12. Kernel $k_{1,K}$ is depicted as moving toward centroid $c_1$ (its closest centroid), while kernel $k_{F,K}$ is depicted as moving toward centroid $c_0$, even though its closest centroid, at least initially, is centroid $c_2$. The intuition is that the classification error would be greater if kernel $k_{F,K}$ were set equal to centroid $c_2$ than if kernel $k_{F,K}$ were set equal to centroid $c_0$, so this is why $k_{F,K}$ moves towards $c_0$. On the other hand, to minimize the clustering error, it does not matter which centroid a kernel migrates towards as long as at the conclusion of the optimization process, the kernel is located close to a centroid. Stated differently, the clustering error component in the loss function is responsible for steering kernels towards one of the centroids and the classification error component can be thought of as influencing which centroid a kernel migrates towards.

The second backpropagation stage is performed until a second classification accuracy is reached. The second classification accuracy associated with the second stage of backpropagation is not necessarily equal to the first classification accuracy. Subsequently, the F×K kernels are quantized by setting each kernel equal to its closest centroid (where "closest" may be used in terms of Euclidian distance). In the example of FIG. 12, kernel $k_{1,K}$ is set equal to centroid $c_1$, and kernel $k_{F,K}$ is set equal to centroid $c_0$.

Figure 13A:
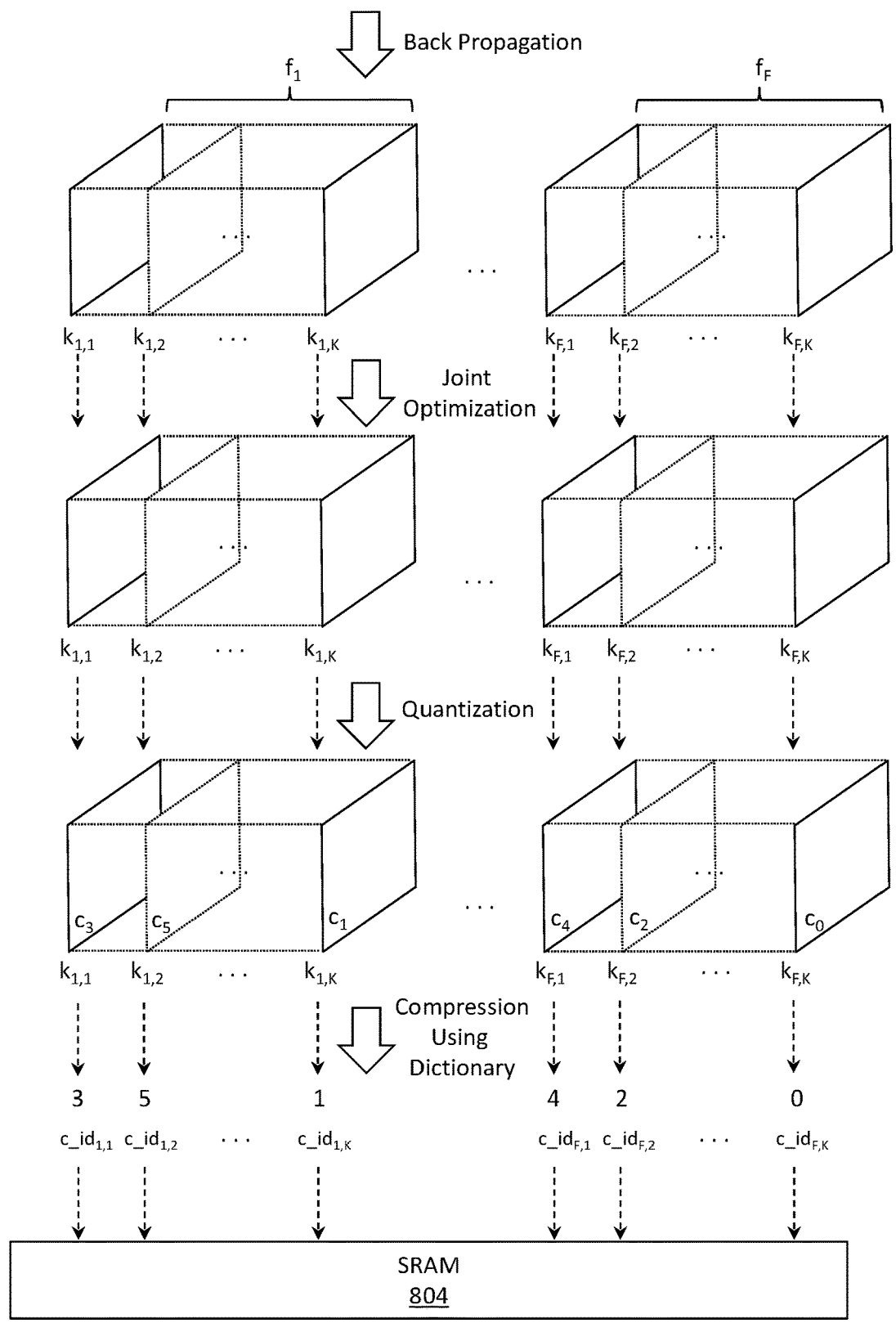
FIG. 13A depicts a diagram to illustrate the quantization and compression of the F filters during the training of the convolutional neural network, in accordance with one embodiment of the invention.
Figure 13B:
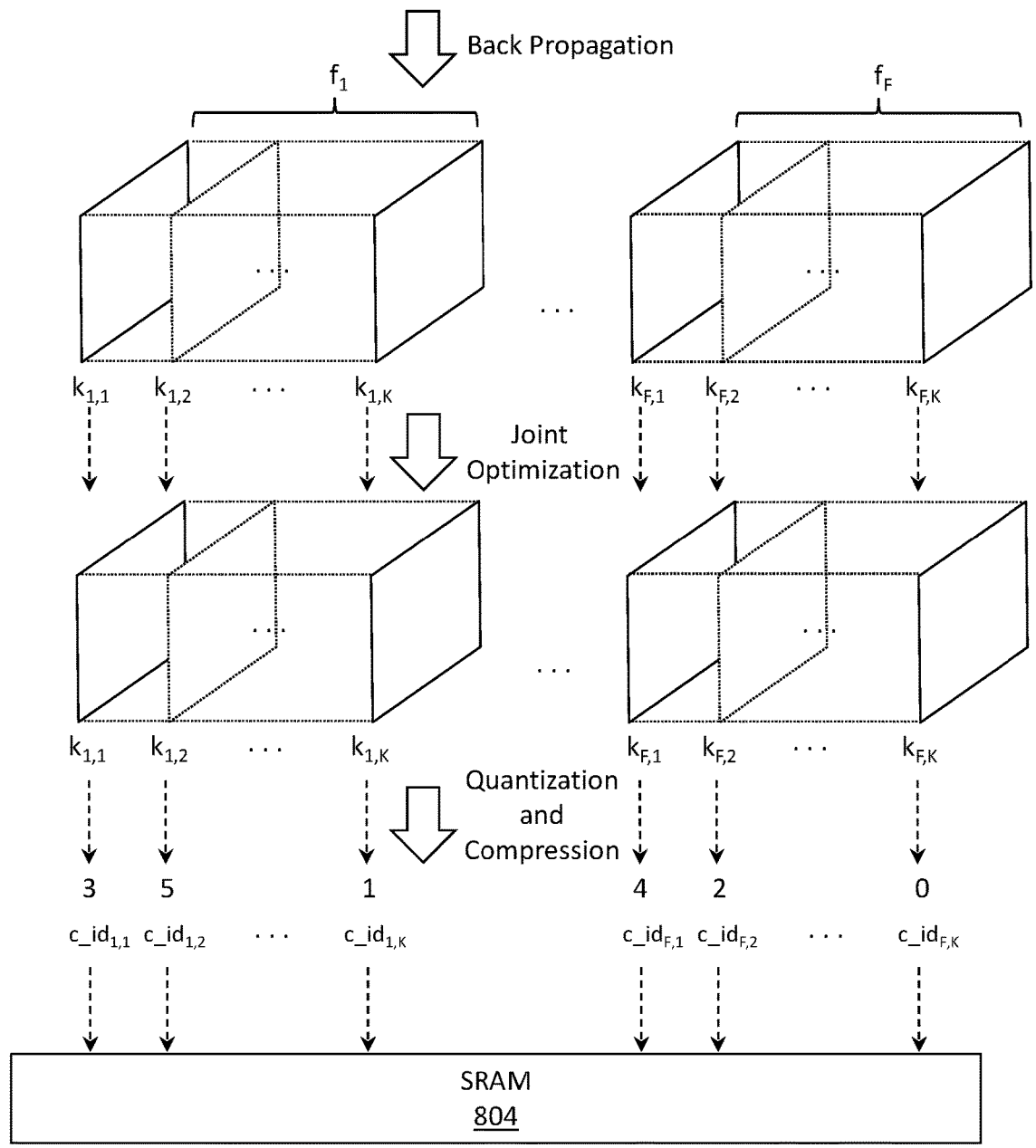
FIG. 13B depicts a diagram to illustrate the quantization and compression of the F filters during the training of the convolutional neural network, in accordance with one embodiment of the invention.

FIG. 13A summarizes the above-described steps of training and quantizing the F filters of layer h, in addition to describing an additional compression step. At the start of the model training process, the convolutional neural network is trained using a first loss function until a first classification accuracy is reached. The first row of filters represents the F filters of layer h at the conclusion of the backpropagation algorithm. Then, the convolutional neural network is trained using a second loss function until a second classification accuracy is reached. This second step of training is noted as "joint optimization" in FIG. 13A, referring to the second loss function formed as a linear combination of the classification error and the clustering error. The second row of filters represents the F filters of layer h at the conclusion of the joint optimization process. The F filters of layer h are then quantized. The number of parameters of each of the kernels of the filters remains unchanged during the quantization process, as shown in the unchanged geometric depiction of a kernel at the conclusion of the quantization process. However, during the quantization process, each kernel is constrained to be one of the C centroids, which is why each of the kernels has been labeled with a centroid. It is understood that the particular labeling of centroids ($k_{1,1}=c_3$, $k_{1,2}=c_5$, . . . ) is provided as an example only. The F quantized filters may then be compressed by substituting each kernel with an identifier of the centroid that the kernel equals. For example, $c_3$ is substituted with 3, $c_5$ is substituted with 5, and so on. A dictionary may be relied upon to perform this substitution. FIG. 14 depicts an example of a dictionary that may be used to map centroid identifiers (also called codewords) to centroids. Finally, the centroid identifiers (or codewords) may be stored in memory 804. While the quantization and compression of kernels was described as two sequential steps in FIG. 13A, it is possible for these two steps to be performed in a single step (i.e., replace each kernel at the conclusion of the joint optimization process with a centroid identifier which identifies the centroid that is closest to the respective kernel), as depicted in FIG. 13B.

At this point, a numerical comparison is presented to demonstrate the reduction in bits that are needed to store the F compressed and quantized filters, as compared to the F "original" filters (top row of FIG. 13A or 13B), as would be the case in a conventional approach. Assume that there are 256 filters (i.e., F=256), and each of the filters has a dimension of 3×3×256. Further assume that each parameter of a filter is stored using 8 bits. Therefore, in a conventional approach, storing the 256 filters from layer h would require storing 3×3×256×256×8 bits=4.7 million bits.

In the approach outlined in FIG. 13A (or FIG. 13B), assume that each filter is decomposed into 256 kernels (i.e., K=256). Further assume that the kernels are quantized into 8 clusters. As a result of the number of clusters being 8, each of the codewords can be stored using 3 bits (i.e., $=\log_2(8)$). Therefore, in the approach of FIG. 13A (or FIG. 13B), storing the 256 filters from layer h would require storing F×K×3 bits=256×256×3=196,608 bits. For a complete comparison, it is noted that the approach of FIG. 13A (or FIG. 13B) also requires storing a dictionary, which essentially requires the storing of 8 centroids or 8×3×3×8 bits (i.e., storing the right column of FIG. 14)=576 bits. Therefore, the total number of bits stored for the 256 filters of layer h using quantization and compression is 196,608 bits+576 bits=197,184 bits. Therefore, in this particular example for the 256 filters of layer h, there is approximately a reduction of 96% in the number of bits that are stored in the approach of FIG. 13A (or FIG. 13B), which improves the functioning of the computing system 800, as compared to a conventional approach.

Figure 15:
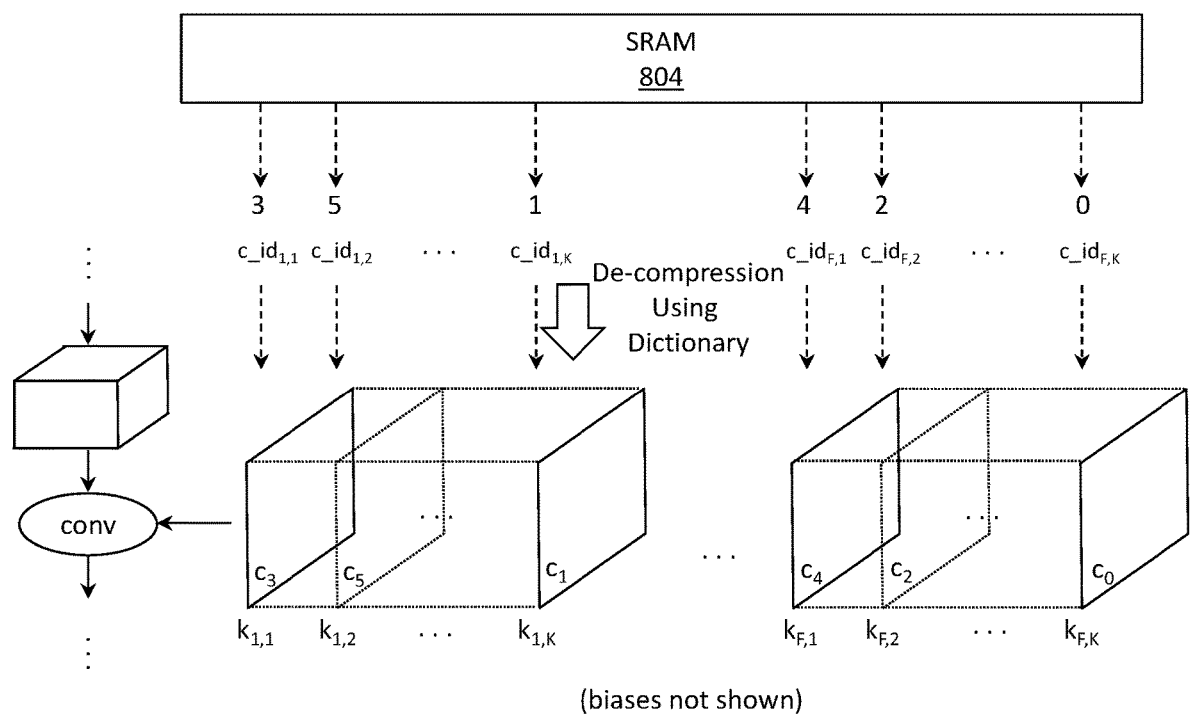
FIG. 15 depicts a diagram to illustrate the de-compression of the F filters during the application of the convolutional neural network, in accordance with one embodiment of the invention.

FIG. 15 describes a decompression operation performed during the model application phase. For layer h, the previously described F×K codewords are retrieved from memory 804, and decompressed using the example dictionary in FIG. 14. The decompression operation involves substituting centroids in place of centroid identifies (or codewords). The decompression step produces F quantized filters, which are then used (along with F biases, not depicted) to perform the above-described convolution operation. It is understood that the same efficiencies described above for the storing of quantized and compressed data in memory 804 also apply to the reading of the quantized and compressed filter data from memory 804.

Figure 16:
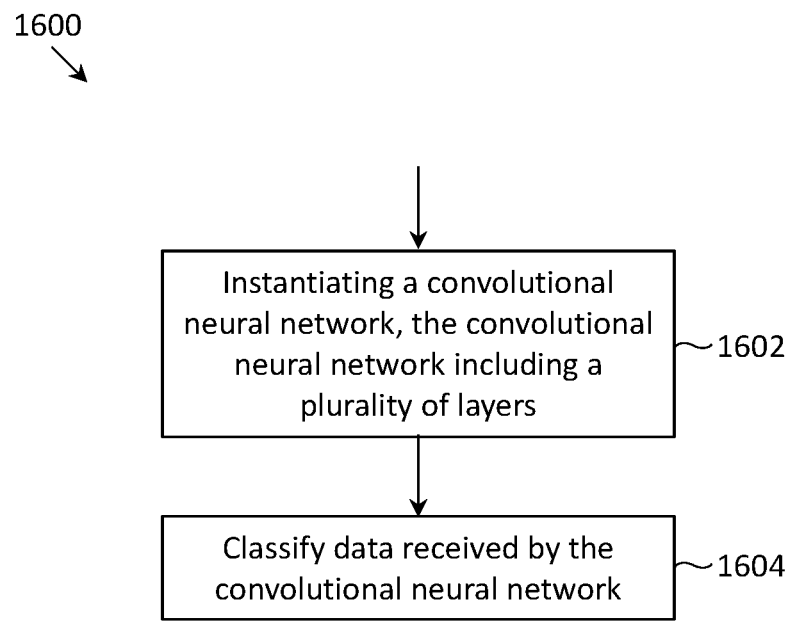
FIG. 16 depicts a flowchart with an overview of the model training and model application of a convolutional neural network, in accordance with one embodiment of the invention.

FIG. 16 depicts flowchart 1600 with an overview of the model training and model application of a convolutional neural network, in accordance with one embodiment of the invention. At step 1602, a convolutional neural network is instantiated on computing system 800. The convolutional neural network may include a plurality of layers, including, in certain embodiments, one or more of a convolution layer, a reLU layer and a max pooling layer. In step 1604, the convolutional neural network may be used to classify data received by the convolutional neural network.

Figure 17:
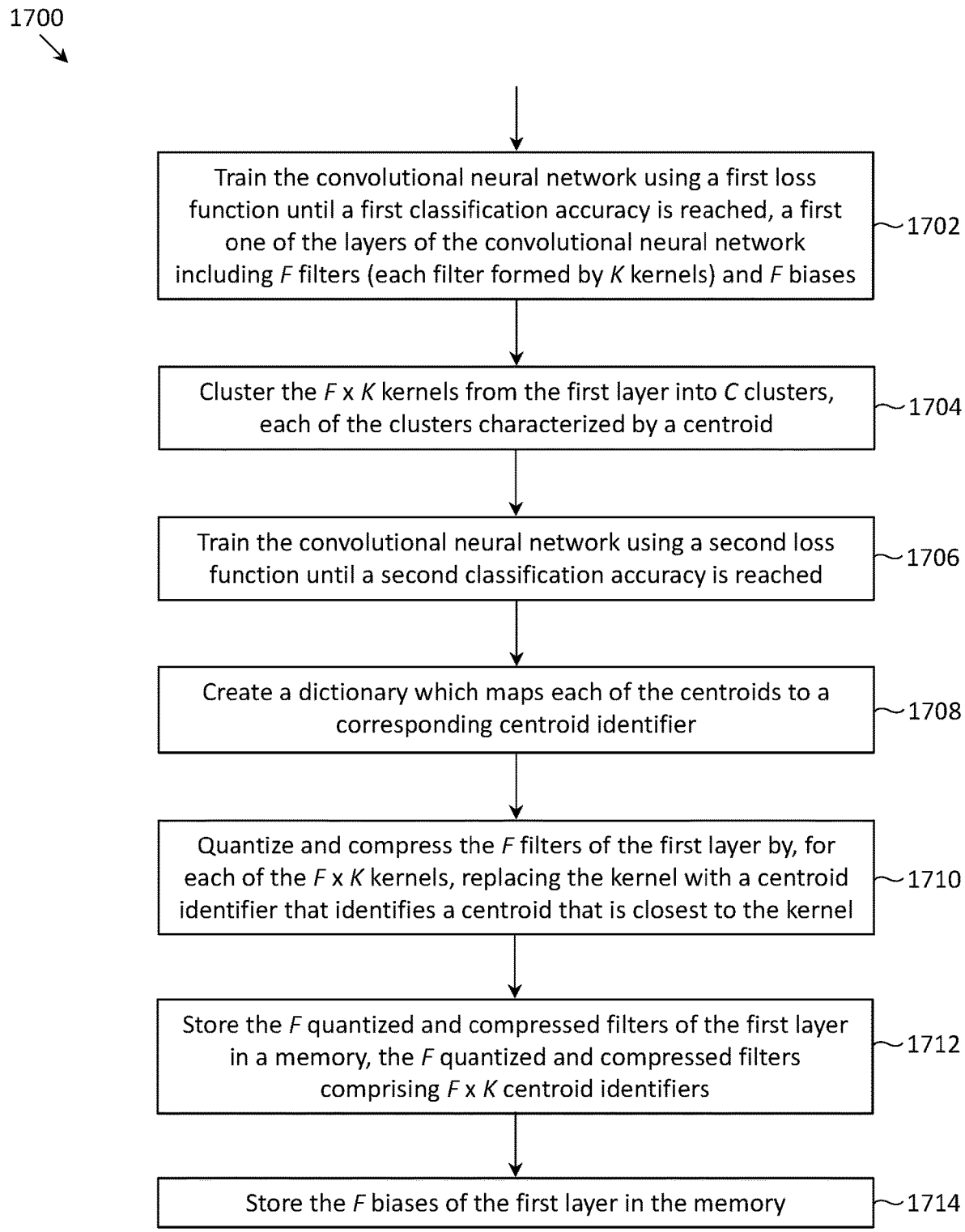
FIG. 17 depicts a flowchart of a process performed during the training of a convolutional neural network, in accordance with one embodiment of the invention.

FIG. 17 depicts flowchart 1700 of a process performed during the training of a convolutional neural network, in accordance with one embodiment of the invention. At step 1702, processor 806 may train the convolutional neural network using a first loss function until a first classification accuracy is reached. A first one of the layers of the convolutional neural network, $l_h$, $h \in \{1, \ldots, L\}$ may include F filters (each filter formed by K kernels) and F biases. For brevity, "a first one of the layers" will be referred to as a "first layer", but it is understood that the "first layer" is meant to refer to one of the layers, not necessary the very first layer. At step 1704, processor 806 may cluster the F×K kernels from the first layer, $l_h$, into C clusters, each of the clusters characterized by a centroid. As explained above, a centroid of a cluster may be calculated as the center of mass of the kernels within the cluster. At step 1706, processor 806 may train the convolutional neural network using a second loss function until a second classification accuracy is reached. At step 1708, processor 806 may create a dictionary which maps each of the centroids to a corresponding centroid identifier. An example of such a dictionary is depicted in FIG. 14. At step 1710, processor 806 may quantize and compress the F quantized filters of the first layer, $l_h$, by, for each of the F×K kernels, replacing the kernel with a centroid identifier that identifies a centroid that is closest to the kernel. At step 1712, processor 806 may store the F quantized and compressed filters of the first layer, $l_h$, in memory 804. The F quantized and compressed filters may comprise F×K centroid identifiers (or F×K codewords). At step 1714, processor 806 may store the F biases of the first layer, $l_h$, in memory 804.

Figure 18:
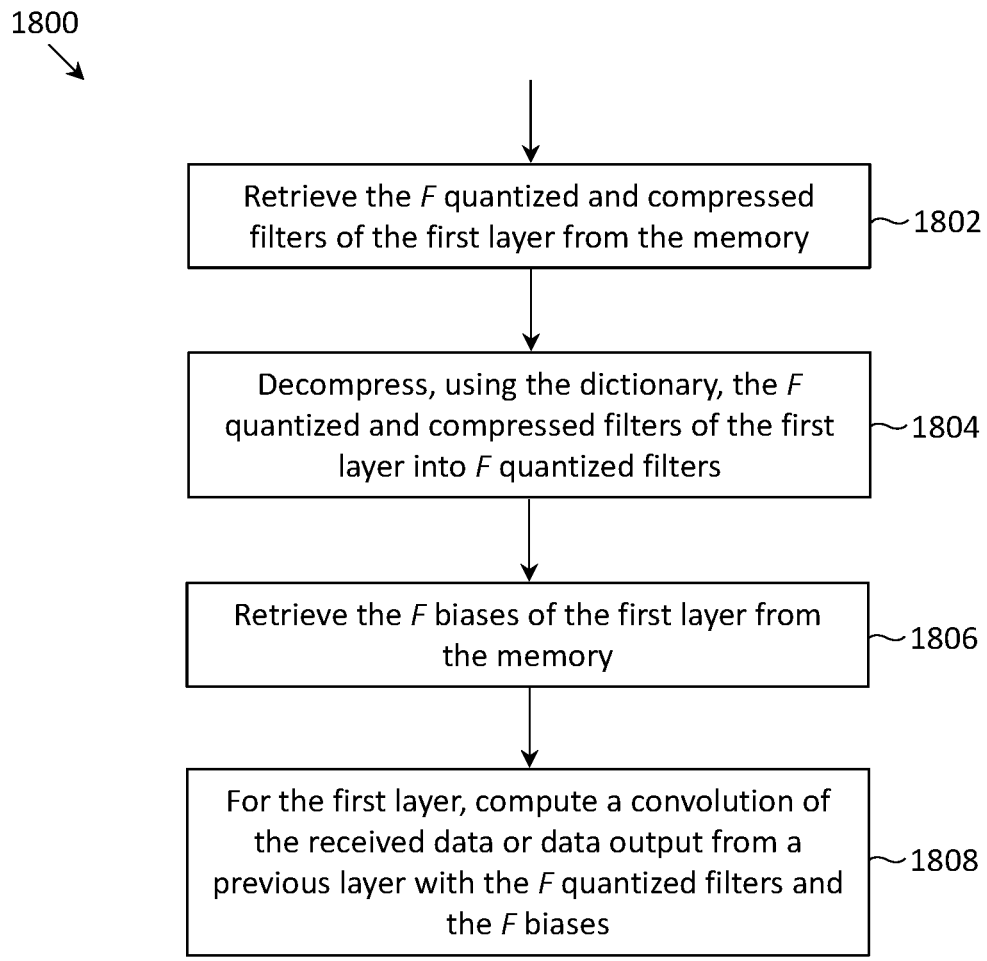
FIG. 18 depicts a flowchart of a process performed during the application of a convolutional neural network, in accordance with one embodiment of the invention.

FIG. 18 depicts flowchart 1800 of a process performed during the application of a convolutional neural network, in accordance with one embodiment of the invention. At step 1802, processor 806 may retrieve the F quantized and compressed filters of the first layer, $l_h$, from memory 804. At step 1804, processor 806 may decompress, using the dictionary, the F quantized and compressed filters of the first layer, $l_h$, into F quantized filters. At step 1806, processor 806 may retrieve the F biases of the first layer, $l_h$, from memory 804. At step 1808, processor 806 may, for the first layer, $l_h$, compute a convolution of the received data or data output from a previous layer with the F quantized filters and the F biases. If the first one of the layers, $l_h$, is for h=1, the convolution may be computed with the data from memory 802 (e.g., 512×512×3 input depicted in FIG. 9). Otherwise, the convolution may be computed with the data from a previous layer. For example, for layer 2 in FIG. 9, the convolution would be computed with the 256×256×64 activation map generated from layer 1, the 128 filters and the 128 biases.

It is noted that while the compression and quantization of filters has been described primarily in association with the convolution operation, it is understood that such algorithms may have similar applicability for other operations in a neural network involving the retrieval of filters (e.g., the LSTM operation). More generally, such algorithms may be applied to recurrent networks (e.g., normal LSTM or recurrent neural networks), which also utilize filters (e.g., mostly 1-dimensional and over time, and not over "space" (e.g., an image)). Such algorithms may additionally be applied to 1-dimensional convolutional and also 3-dimensional convolutional networks, in which a 3-dimensional convolution layer could be used to process image-time data where the third dimension would be the time dimension (in other words, the data would be video data). Even more generally, such algorithms may be applied to groups of parameters, as is present in a normal non-convolutional LSTM cell, in which every cell is described by a group of parameters. The grouping of parameters in a machine learning (ML) model could be designed in many possible ways.

Figure 19:
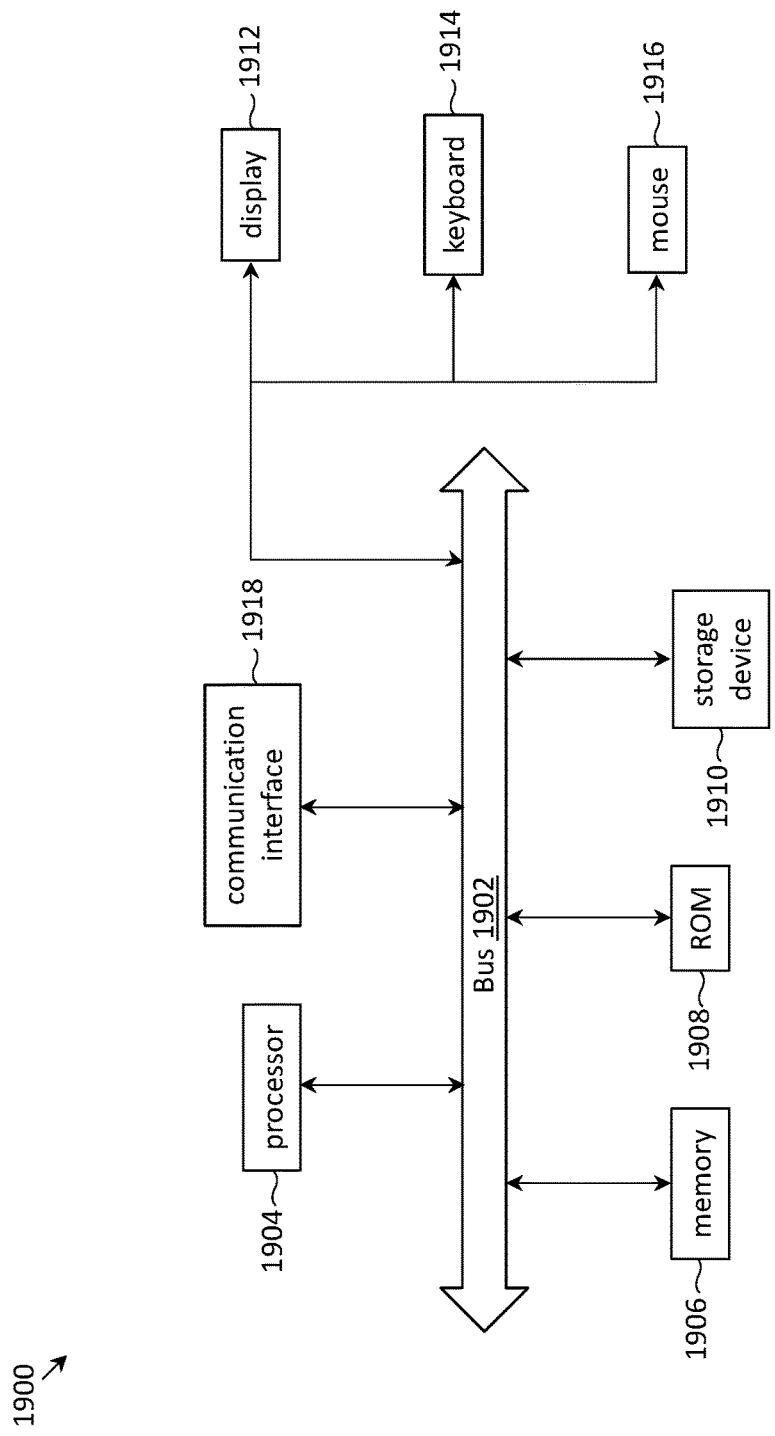
FIG. 19 depicts components of a computer system in which computer readable instructions instantiating the methods of the present invention may be stored and executed.

FIG. 19 depicts components of a computer system in which computer readable instructions instantiating the methods of the present invention may be stored and executed. As is apparent from the foregoing discussion, aspects of the present invention involve the use of various computer systems and computer readable storage media having computer-readable instructions stored thereon. FIG. 19 provides an example of a system 1900 that may be representative of any of the computing systems (e.g., computing system 800) discussed herein. Examples of system 1900 may include a smartphone, a desktop, a laptop, a mainframe computer, an embedded system, etc. Note, not all of the various computer systems have all of the features of system 1900. For example, certain ones of the computer systems discussed above may not include a display inasmuch as the display function may be provided by a client computer communicatively coupled to the computer system or a display function may be unnecessary. Such details are not critical to the present invention.

System 1900 includes a bus 1902 or other communication mechanism for communicating information, and a processor 1904 coupled with the bus 1902 for processing information. Computer system 1900 also includes a main memory 1906, such as a random-access memory (RAM) or other dynamic storage device, coupled to the bus 1902 for storing information and instructions to be executed by processor 1904. Main memory 1906 also may be used for storing temporary variables or other intermediate information during execution of instructions to be executed by processor 1904. Computer system 1900 further includes a read only memory (ROM) 1908 or other static storage device coupled to the bus 1902 for storing static information and instructions for the processor 1904. A storage device 1910, for example a hard disk, flash memory-based storage medium, or other storage medium from which processor 1904 can read, is provided and coupled to the bus 1902 for storing information and instructions (e.g., operating systems, applications programs and the like).

Computer system 1900 may be coupled via the bus 1902 to a display 1912, such as a flat panel display, for displaying information to a computer user. An input device 1914, such as a keyboard including alphanumeric and other keys, may be coupled to the bus 1902 for communicating information and command selections to the processor 1904. Another type of user input device is cursor control device 1916, such as a mouse, a trackpad, or similar input device for communicating direction information and command selections to processor 1904 and for controlling cursor movement on the display 1912. Other user interface devices, such as microphones, speakers, etc. are not shown in detail but may be involved with the receipt of user input and/or presentation of output.

The processes referred to herein may be implemented by processor 1904 executing appropriate sequences of computer-readable instructions contained in main memory 1906. Such instructions may be read into main memory 1906 from another computer-readable medium, such as storage device 1910, and execution of the sequences of instructions contained in the main memory 1906 causes the processor 1904 to perform the associated actions. In alternative embodiments, hard-wired circuitry or firmware-controlled processing units may be used in place of or in combination with processor 1904 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 1900 or similar electronic computing device, that manipulates and transforms data represented as physical (electronic) quantities within its registers and memories into other data similarly represented as physical quantities within its memories or registers or other such information storage, transmission or display devices.

Computer system 1900 also includes a communication interface 1918 coupled to the bus 1902. Communication interface 1918 may provide a two-way data communication channel with a computer network, which provides connectivity to and among the various computer systems discussed above. For example, communication interface 1918 may be a local area network (LAN) card to provide a data communication connection to a compatible LAN, which itself is communicatively coupled to the Internet through one or more Internet service provider networks. The precise details of such communication paths are not critical to the present invention. What is important is that computer system 1900 can send and receive messages and data through the communication interface 1918 and in that way communicate with hosts accessible via the Internet. It is noted that the components of system 1900 may be located in a single device or located in a plurality of physically and/or geographically distributed devices.

Thus, cluster compression for compressing weights in neural networks has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:
    instantiating a convolutional neural network on a computing system, the convolutional neural network including a plurality of layers, wherein instantiating the convolutional neural network comprises:
        training the convolutional neural network using a first loss function until a first classification accuracy is reached, wherein the first loss function calculates a classification error of the convolutional neural network, wherein training the convolutional neural network with the first loss function comprises optimizing, for a first one of the layers, a first set of F filters and a first set of F biases so as to minimize the first loss function, wherein each of the F filters is formed from K kernels, wherein K and F are each greater than one, wherein each of the kernels consists of nine parameters and wherein each of the biases is scalar;
        clustering the set of F×K kernels of the first layer into a set of C clusters, wherein each of the clusters is characterized by a centroid, thereby the C clusters being characterized by C centroids, wherein each of the centroids consists of nine parameters, and wherein C is less than F×K;

training the convolutional neural network using a second loss function until a second classification accuracy is reached;

creating a dictionary which maps each of the centroids to a corresponding scalar centroid identifier;

quantizing and compressing the F filters of the first layer by, for each of the F×K kernels, replacing the nine parameters of the kernel with one of the scalar centroid identifiers from the dictionary;

storing the F quantized and compressed filters of the first layer in a memory of the computing system, the F quantized and compressed filters comprising F×K scalar centroid identifiers; and storing the F biases of the first layer in the memory; and classifying data received by the convolutional neural network, wherein the classification comprises:

retrieving the F quantized and compressed filters of the first layer from the memory, the F quantized and compressed filters comprising the F×K scalar centroid identifiers;

decompressing, using the dictionary, the F quantized and compressed filters of the first layer into F quantized filters by mapping the F×K scalar centroid identifiers into F×K corresponding quantized kernels, the F×K corresponding quantized kernels each having nine parameters and forming the F quantized filters;

retrieving the F biases of the first layer from the memory; and for the first layer, computing a convolution of the received data or data output from a layer previous to the first layer with the F quantized filters and the F biases, wherein a number of channels of the received data or data output from the layer previous to the first layer is equal to K.

2. The method of claim 1, further comprising:

during the instantiation of the convolutional neural network, further storing the dictionary in the memory; and during the classification of the received data, further retrieving the dictionary from the memory.

3. The method of claim 1, wherein C is equal to $2^n$, where n is a natural number.

4. The method of claim 3, wherein each of the scalar centroid identifiers is expressed using n-bits.

5. The method of claim 1, wherein the F×K kernels are clustered into the C clusters using the k-means algorithm.

6. The method of claim 1, wherein each of the F×K kernels is represented by a 3×3 matrix of parameters.

* * * * *